US012625381B2

(12) United States Patent
Hayashida et al.

(10) Patent No.: US 12,625,381 B2
(45) Date of Patent: May 12, 2026

(54) ILLUMINATION APPARATUS AND ILLUMINATION METHOD

(71) Applicant: Lasertec Corporation, Kanagawa (JP)

(72) Inventors: Keitaro Hayashida, Yokohama (JP); Shinji Tanaka, Yokohama (JP); Masaki Koichi, Yokohama (JP); Haruhiko Kusunose, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 110 days.

(21) Appl. No.: 18/599,566

(22) Filed: Mar. 8, 2024

(65) Prior Publication Data

US 2024/0302670 A1    Sep. 12, 2024

(30) Foreign Application Priority Data

Mar. 9, 2023    (JP) ................................. 2023-036152
Feb. 16, 2024   (JP) ................................. 2024-022288

(51) Int. Cl.
G02B 27/09    (2006.01)
G02B 26/08    (2006.01)
(Continued)

(52) U.S. Cl.
CPC ..... G02B 27/0933 (2013.01); G02B 26/0816 (2013.01); G02B 26/10 (2013.01);
(Continued)

(58) Field of Classification Search
CPC ............ G02B 27/0933; G02B 26/0816; G02B 26/10; G02B 27/0927; G02B 27/0977;
(Continued)

(56) References Cited

U.S. PATENT DOCUMENTS 5,173,748 A * 12/1992 Bilhorn ................. G01J 3/2803
356/328
2002/0001759 A1    1/2002 Ohashi et al.
(Continued)

FOREIGN PATENT DOCUMENTS

JP        H11-072905 A      3/1999
JP        2001-100104 A     4/2001
(Continued)

OTHER PUBLICATIONS

Office Action for Japanese Application No. 2024-022288, mailed Jul. 22, 2025.
(Continued)

*Primary Examiner* — Tony Ko
(74) *Attorney, Agent, or Firm* — ALSTON & BIRD LLP

(57)    ABSTRACT

Provided are an illumination apparatus and an illumination method capable of uniformly illuminating a visual field region detected by a detector. The present disclosure provides an illumination apparatus including: a drive unit configured to drive an optical member such that illumination light scans, in one direction, a visual field region that is a region extending in the one direction on a sample; and a control unit configured to control the drive unit to cause the illumination light to scan in synchronization with a transfer of a sensor that receives light from the visual field region illuminated by the illumination light.

24 Claims, 19 Drawing Sheets

(51) Int. Cl.

| | |
|---|---|
| *G02B 26/10* | (2006.01) |
| *H04N 23/72* | (2023.01) |
| *H04N 23/74* | (2023.01) |
| *H04N 23/75* | (2023.01) |
| *H04N 25/71* | (2023.01) |
| *H05G 2/00* | (2006.01) |
| *G02B 5/08* | (2006.01) |

(52) U.S. Cl.
CPC ..... *G02B 27/0927* (2013.01); *G02B 27/0977* (2013.01); *H04N 23/72* (2023.01); *H04N 23/74* (2023.01); *H04N 23/75* (2023.01); *H04N 25/71* (2023.01); *H05G 2/008* (2013.01); *G02B 5/0891* (2013.01)

(58) Field of Classification Search
CPC ...... G02B 5/0891; H04N 23/72; H04N 23/74; H04N 23/75; H04N 25/71; H05G 2/008
See application file for complete search history.

(56) References Cited

U.S. PATENT DOCUMENTS

| | | | |
|---|---|---|---|
| 2003/0007137 | A1 | 1/2003 | Iwanaga |
| 2004/0159787 | A1 | 8/2004 | Nakasuji et al. |
| 2015/0041666 | A1 | 2/2015 | Chuang et al. |
| 2017/0235031 | A1 | 8/2017 | Takehisa et al. |
| 2018/0073992 | A1 | 3/2018 | Van Voorst et al. |
| 2019/0204235 | A1 | 7/2019 | Nishizawa et al. |
| 2020/0003685 | A1 | 1/2020 | Jeon |

FOREIGN PATENT DOCUMENTS

| | | | |
|---|---|---|---|
| JP | 2002-373839 | A | 12/2002 |
| JP | 2004-095281 | A | 3/2004 |
| JP | 2006-014133 | A | 1/2006 |
| JP | 2010-236966 | A | 10/2010 |
| JP | 2011-221555 | A | 11/2011 |
| JP | 2012-002675 | | 1/2012 |
| JP | 2016-534341 | A | 11/2016 |
| JP | 6053084 | B1 | 12/2016 |
| JP | 6462843 | | 1/2019 |
| JP | 2019-158431 | A | 9/2019 |
| JP | 2021-009274 | A | 1/2021 |
| JP | 2022-019719 | A | 1/2022 |
| WO | WO 2015/021411 | A1 | 2/2015 |

OTHER PUBLICATIONS

Japanese Application No. 2024-022288, Office Action mailed Jan. 6, 2026.

* cited by examiner

1

INTENSITY PROFILE
OF EUV

RELATIVE
INTENSITY
OF IR

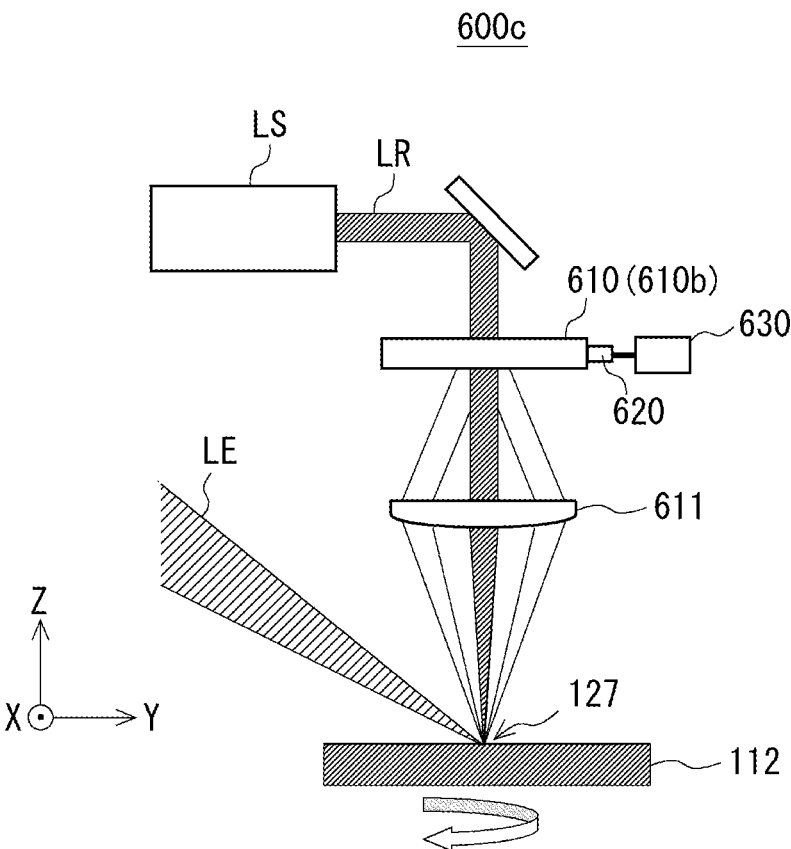
F i g. 25

ILLUMINATION APPARATUS AND ILLUMINATION METHOD

INCORPORATION BY REFERENCE

This application is based upon and claims the benefit of priority from Japanese patent applications No. 2023-036152, filed on Mar. 9, 2023, and No. 2024-022288, filed on Feb. 16, 2024, the disclosure of which is incorporated herein in its entirety by reference.

BACKGROUND

The present disclosure relates to an illumination apparatus and an illumination method.

In Published Japanese Translation of PCT International Publication for Patent Application, No. 2016-534341, Japanese Unexamined Patent Application Publication No. 2010-236966, and Japanese Unexamined Patent Application Publication No. H11-072905, inspection apparatuses for defects occurring in semiconductor substrates and photomasks are disclosed.

SUMMARY

In inspection for mask defects using extreme ultra violet (EUV) light, it is necessary to uniformly and efficiently illuminate an inspection region of a sample. When a laser produced plasma (LPP) method is used for an EUV light source that generates EUV light and an illumination optics system has a critical illumination configuration, a focusing profile of laser light is directly reflected in an illumination profile.

For example, intensity distribution of a cross section orthogonal to an optical axis of laser light exciting a target in the LPP method has a Gaussian profile. For this reason, in order to uniformly illuminate a visual field region on a sample detected by a horizontally long sensor plane of a sensor such as a camera with illumination light having a horizontally long and flat profile, it is necessary to construct a complex optical system. For example, it is also possible to form illumination light having a nearly flat illumination profile by expanding or splitting a single focused beam with beam expanding or splitting using a cylindrical lens, a crystal plate, or the like. Thereby, the illumination light can be formed into a shape that covers the visual field region. However, the optical system becomes complicated and the quantity of light emitting out of the visual field region increases, resulting in inefficiency.

In Japanese Unexamined Patent Application Publication No. 2019-158431, since there is a disadvantage that illumination NA distribution varies depending on a position, a method of scanning on a light source side is preferable.

An object of the present disclosure is to solve such problems, and to provide an illumination apparatus and an illumination method that can uniformly illuminate a visual field region detected by a detector.

An illumination apparatus according to the present disclosure includes: a drive unit configured to drive an optical member such that illumination light scans, in one direction, a visual field region that is a region extending in the one direction on a sample; and a control unit configured to control the drive unit to cause the illumination light to scan in synchronization with an integration cycle of a TDI sensor that receives light from the visual field region illuminated by the illumination light.

In the illumination apparatus, the illumination light may contain EUV light generated from plasma generated by irradiation of a target with laser light, the optical member may include a mirror that reflects the laser light onto the target, and the drive unit may cause the illumination light to scan the visual field region in the one direction by driving the optical member such that the laser light scans the target in a predetermined direction.

In the illumination apparatus, the drive unit may drive the optical member such that a relationship between a position of the laser light on the target and time involves a triangular wave.

In the illumination apparatus, the drive unit may drive the optical member such that a relationship between a position of the laser light on the target and time involves at least one of the three waveforms: triangular wave, sine wave, rectangular wave, or a combined and overlapped waveform of any of those three waveforms.

In the illumination apparatus, a spot of the illumination light in the visual field region may have a circular shape.

In the illumination apparatus, a spot of the illumination light in the visual field region may have an ellipse shape with a major axis extending in another direction orthogonal to the one direction.

In the illumination apparatus, the optical member may include at least one of a mirror that reflects the illumination light onto the sample, a beam shifter that shifts an illumination position of the illumination light, and an acousto-optical element that shifts an illumination position of the illumination light, and the drive unit may drive the optical member such that the illumination light scans the visual field region in the one direction.

An illumination apparatus according to the present disclosure includes: a drive unit configured to drive an optical member such that illumination light scans, in one direction, a visual field region that is a region extending in the one direction on a sample; and a control unit configured to control the drive unit to cause the illumination light to scan more than a predetermined plurality of times of scanning in one-time integration cycle of a TDI sensor that receives light from the visual field region illuminated by the illumination light.

An illumination method according to the present disclosure includes steps of: driving an optical member such that illumination light scans, in one direction, a visual field region that is a region extending in the one direction on a sample; and causing the illumination light to scan in synchronization with an integration cycle of a TDI sensor that receives light from the visual field region illuminated by the illumination light.

In the illumination method, the illumination light may contain EUV light generated from plasma generated by irradiation of a target with laser light, the optical member may include a mirror that reflects the laser light onto the target, and the step of driving the optical member may include causing the illumination light to scan the visual field region in the one direction by driving the optical member such that the laser light scans the target in a predetermined direction.

In the illumination method, the step of driving the optical member may include driving the optical member such that a relationship between a position of the laser light on the target and time involves a triangular wave.

In the illumination method, the step of driving the optical member may include driving the optical member such that a relationship between a position of the laser light on the target and time involves at least one of the three waveforms:

triangular wave, sine wave, rectangular wave, or a combined and overlapped waveform of any of those three waveforms.

In the illumination method, a spot of the illumination light in the visual field region may have a circular shape.

In the illumination method, a spot of the illumination light in the visual field region may have an ellipse shape with a major axis extending in another direction orthogonal to the one direction.

In the illumination method, the optical member may include at least one of a mirror that reflects the illumination light onto the sample, a beam shifter that shifts an illumination position of the illumination light, and an acousto-optical element that shifts an illumination position of the illumination light, and the step of driving the optical member may include driving the optical member such that the illumination light scans the visual field region in the one direction.

In the illumination apparatus, the apparatus may further include a light source control unit configured to change an intensity of the illumination light in synchronization with the integration cycle of the TDI sensor.

In the illumination method, the method may further include a step of changing an intensity of the illumination light in synchronization with the integration cycle of the TDI sensor.

An illumination method according to the present disclosure includes steps of: driving an optical member such that illumination light scans, in one direction, a visual field region that is a region extending in the one direction on a sample; and causing the illumination light to scan more than a predetermined plurality of times of scanning in one-time integration cycle of a TDI sensor that receives light from the visual field region illuminated by the illumination light.

According to the present disclosure, it is possible to provide the illumination apparatus and the illumination method that can uniformly illuminate the visual field region detected by a detector.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 25 is a diagram illustrating the optical member driven by the drive unit in the illumination apparatus according to the fifth embodiment.

DESCRIPTION OF EMBODIMENTS

Figure 1:
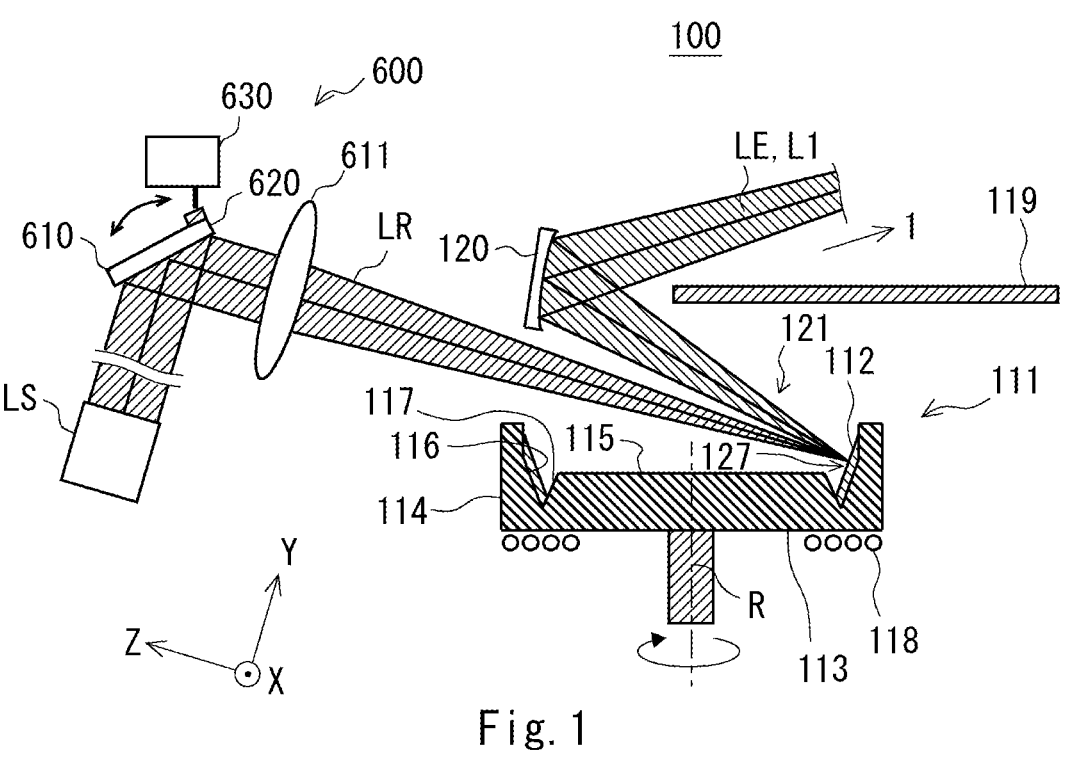
FIG. 1 is a cross-sectional view illustrating a light source according to a first embodiment.

Specific configurations of the present embodiments will be described below with reference to the drawings. The following description shows preferred embodiments of the present disclosure, and the scope of the present disclosure is not limited to the following embodiments. In the following description, the same reference numeral indicate substantially the same components.

First Embodiment

An illumination apparatus according to a first embodiment will be described. The illumination apparatus of the present embodiment generates illumination light used in an optical apparatus such as an inspection apparatus. The illumination apparatus is provided in a light source to generate illumination light suitable for the optical apparatus. The illumination apparatus may be provided in an optical apparatus to generate illumination light suitable for the optical apparatus. Before description of the illumination apparatus, a light source and an optical apparatus will be described. Then, the illumination apparatus will be described. Thus, the illumination apparatus is more clarified.
Light Source A light source generates illumination light used in an optical apparatus. When the optical apparatus is an inspection apparatus, the light source generates illumination light that illuminates an inspection target in the inspection apparatus. Further, when the optical apparatus is an exposure apparatus, the light source may generate exposure light in the exposure apparatus. As an example of the light source, an example will be described in which a molten metal held in a container is used as a target. The target of the light source is not limited to the molten metal held in the container, but may also include a solid metal, liquid droplets, or the like that generates plasma by irradiation with laser light.

Figure 2:
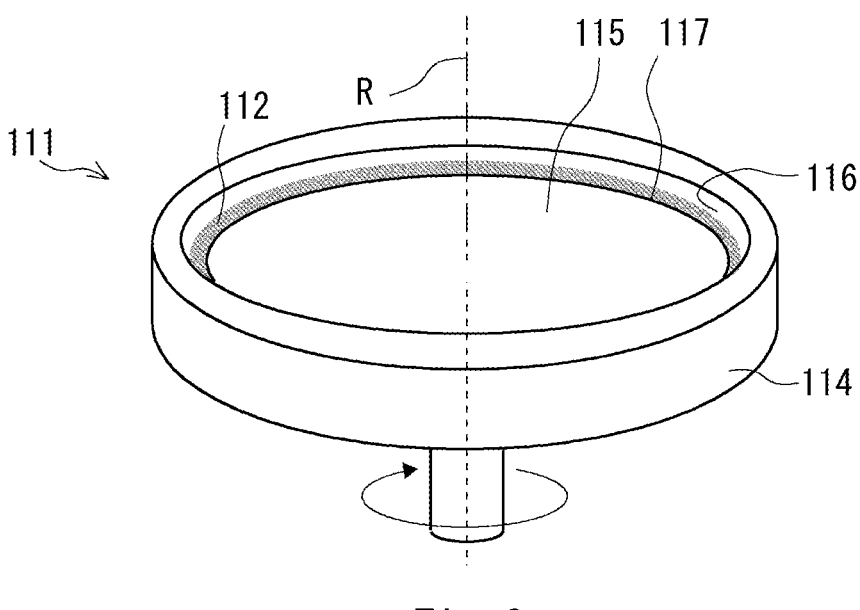
FIG. 2 is a perspective view illustrating a container of the light source according to the first embodiment.

FIG. 1 is a cross-sectional view illustrating a light source according to the first embodiment. FIG. 2 is a perspective view illustrating a container of the light source according to the first embodiment. As illustrated in FIGS. 1 and 2, a light source 100 includes a container 111. The container 111 is, for example, a crucible in which a metal is dissolved. The container 111 holds a target 112 such as a molten metal that generates plasma 127 by irradiation with laser light LR. An example of the target 112 includes a molten metal held in the container 111. The target 112 is not limited to the molten metal held in the container 111, but may be a solid metal, liquid droplets, or the like as long as it is a substance that generates the plasma 127 by irradiation with the laser light LR. The molten metal is, for example, molten tin (Sn) or molten lithium (Li), but may be another material as long as it is a substance that generates the plasma 127 by irradiation with the laser light LR, without being limited to tin or lithium.

The container 111 has a rotation axis R, and rotates around the rotation axis R. The container 111 has, for example, a cylindrical shape with one opening closed. The closed portion of the container 111 is referred to as a bottom portion 113. The cylindrical portion of the container 111 is referred to as a cylindrical portion 114. The rotation axis R of the container 111 extends in a vertical direction, for example. An inner surface of the bottom portion 113 is referred to as a bottom surface 115. An inner surface of the cylindrical portion 114 is referred to as an inner circumferential surface 116. A groove 117 may be formed at a joining portion between the bottom portion 113 and the cylindrical portion 114.

The inner circumferential surface 116 formed to surround the rotation axis R may include a cylindrical portion having a constant distance from the rotation axis R, or may include a cone-shaped portion that expands outward toward the top. For example, the cone-shaped portion of the inner circumferential surface 116 is coupled to the groove 117.

The light source 100 may include a heater 118, a debris shield 119, and a collector mirror 120 in addition to the container 111. By heating of the heater 118, the target 112 such as the molten metal can be formed in the container 111. The collector mirror 120 reflects generated EUV light LE. The EUV light LE is generated from the plasma 127 generated by irradiation on the target 112 with the laser light LR. The debris shield 119 is disposed in an opening 121 to cover the target 112.

The light source 100 may include an exciting laser LS that generates the laser light LR, or may introduce the laser light LR from the exciting laser LS installed outside the light source 100 to irradiate the target 12. The laser light LR is an IR laser light, for example. The target 112 is irradiated with the laser light LR under control of an illumination apparatus 600. For example, the laser light LR is reflected by an optical member 610 of the illumination apparatus 600, and focused by a focusing lens 611. Thereby, the laser light LR irradiates the target 112. The EUV light generated from the plasma 127 generated in the target 112 is emitted, as illumination light L1, to the optical apparatus such as the inspection apparatus 1. Therefore, the illumination light L1 may include the EUV light LE generated from the plasma 127 generated by irradiating the target 112 with the laser light LR. The illumination apparatus 600 will be described below.
Optical Apparatus An optical apparatus will be described below. In the following, the optical apparatus will be described using an inspection apparatus as an example.

Figure 3:
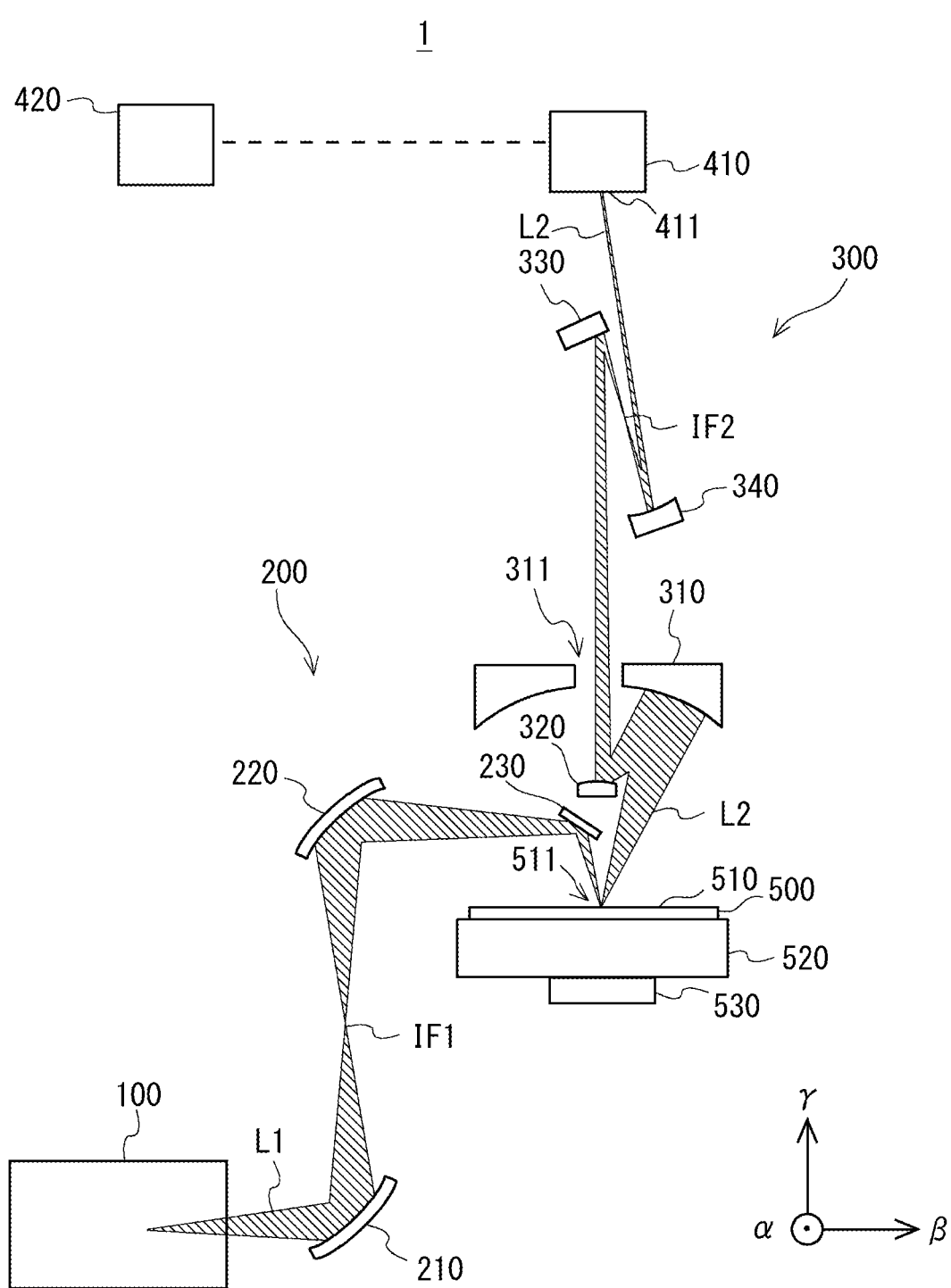
FIG. 3 is a configuration diagram illustrating an inspection apparatus according to the first embodiment.

FIG. 3 is a configuration diagram illustrating the inspection apparatus according to the first embodiment. As illustrated in FIG. 3, the inspection apparatus 1 includes an illumination optics system 200, a detection optics system 300, a detector 410, and an image processing unit 420. The inspection apparatus 1 may further include the light source 100. The inspection apparatus 1 is used to inspect defects of a sample 500 using the illumination light L1 generated by the light source 100. The sample 500 is an EUV mask, for example. The sample 500 is not limited to the EUV mask, and may be a semiconductor substrate or the like.

The illumination optics system 200 includes an ellipsoid mirror 210, an ellipsoid mirror 220, and a dropping mirror 230. The detection optics system 300 includes a holed concave mirror 310, a convex mirror 320, a planar mirror 330, and a concave mirror 340. The holed concave mirror 310 and the convex mirror 320 form a Schwarzschild magnification optics system.

The light source 100 generates illumination light L1. The illumination light L1 contains, for example, EUV light LE having a wavelength of 13.5 nm, which is the same wavelength as an exposure wavelength for the EUV mask serving as the sample 500. The illumination light L1 may contain light other than the EUV light. The illumination light L1 generated from the light source 100 is reflected on the ellipsoid mirror 210. The illumination light L1 reflected on the ellipsoid mirror 210 travels while being narrowed down and is focused at a focusing point IF1. Therefore, the ellipsoid mirror 210 reflects the illumination light L1, which is generated from the light source 100, as convergent light. The focusing point IF1 is arranged in a position conjugate to an upper surface 510 of the sample 500 such as the EUV mask and a detection surface 411 of the detector 410.

After passing through the focusing point IF1, the illumination light L1 travels while spreading and is incident on a reflecting mirror such as the ellipsoid mirror 220. Therefore, the illumination light L1 reflected on the ellipsoid mirror 210 is incident on the ellipsoid mirror 220 as diverging light via the intermediate focusing point IF1. The illumination light L1 incident on the ellipsoid mirror 220 is reflected on the ellipsoid mirror 220, travels while being narrowed down, and incident on the dropping mirror 230. In other words, the ellipsoid mirror 220 reflects the incident illumination light L1 as convergent light. Then, the ellipsoid mirror 220 causes the illumination light L1 to be incident on the dropping mirror 230. The dropping mirror 230 is disposed directly above the EUV mask. The illumination light L1, which has been incident on the dropping mirror 230 and reflected thereon, is incident on the sample 500. Therefore, the dropping mirror 230 allows the illumination light L1 reflected on the ellipsoid mirror 220 to be incident on the sample 500 by reflecting the illumination light L1 onto the sample 500.

The ellipsoid mirror 220 focuses the illumination light L1 onto the sample 500. The illumination optics system 200 is installed so that an image of the light source 100 is formed on the upper surface 510 of the sample 500 when the illumination light L1 illuminates the sample 500. Therefore, the illumination optics system 200 serves as critical illumination. In this way, the illumination optics system 200 illuminates the sample 500 such as the EUV mask, using the critical illumination due to the illumination light L1 generated by the light source 100.

The sample 500 is disposed on a stage 520. Here, a plane parallel to the upper surface 510 of the sample 500 is defined as an αβ-plane and a direction perpendicular to the αβ-plane is defined as a γ-axis direction. The illumination light L1 is incident on the sample 500 in a direction inclined from the γ-axis direction. In other words, the illumination light L1 is obliquely incident on the sample 500 and illuminates the sample 500.

The stage 520 is a three-dimensional drive stage including a drive unit 530. The drive unit 530 can illuminate a desired region of the sample 500 by moving the stage 520 within the αβ-plane. Further, the drive unit 530 can perform focus adjustment by moving the stage 520 in the γ-axis direction.

The illumination light L1 emitted from the light source 100 illuminates an inspection region on the sample 500. The inspection region illuminated by the illumination light L1 is, for example, an area of 0.5 mm square. The inspection region is not limited to 0.5 mm square. The illumination light L1 is incident on the sample 500 from a direction inclined with respect to the γ-axis direction. Light emitted from the sample 500 illuminated by the illumination light L1 is incident on the holed concave mirror 310. The light emitted from the sample 500 illuminated by the illumination light L1 will be described below as reflected light L2. The light, which has been incident on the holed concave mirror 310 from the sample 500, is not limited to the reflected light L2, and may contain diffracted light or the like. The reflected light L2 reflected on the sample 500 is incident on the holed concave mirror 310. A hole 311 is provided at a center of the holed concave mirror 310. The holed concave mirror 310 focuses the reflected light L2 emitted from the sample 500, and reflects the focused reflected light L2 as convergent light.

The reflected light L2 reflected on the holed concave mirror 310 is incident on the convex mirror 320. The convex mirror 320 reflects the reflected light L2 reflected on the holed concave mirror 310 toward the hole 311 of the holed concave mirror 310. The reflected light L2, which has passed through the hole 311, is incident on the planar mirror 330. The reflected light L2 reflected on the convex mirror 320 is incident on the planar mirror 330 through the hole 311 of the holed concave mirror 310, as the convergent light. The reflected light L2 incident on the planar mirror 330 is reflected on the planar mirror 330. The reflected light L2 reflected on the planar mirror 330 travels while being narrowed down and is focused at a focusing point IF2. Therefore, the planar mirror 330 reflects the incident reflected light L2 as convergent light. The focusing point IF2 may also be called an aperture diaphragm. The focusing point IF2 is arranged in a position conjugate to the upper surface 510 of the sample 500 and the detection surface 411 of the detector 410.

After passing through the focusing point IF2, the reflected light L2 travels while spreading and is incident on the concave mirror 340. Therefore, the reflected light L2 reflected on the planar mirror 330 as convergent light is incident on the concave mirror 340 via the focusing point IF2 as diverging light. The concave mirror 340 reflects the incident reflected light L2 to the detector 410 as convergent light. The reflected light L2 reflected on the concave mirror 340 is detected by the detector 410. In this way, the detection optics system 300 focuses the reflected light L2 emitted from the sample 500 illuminated by the illumination light L1, and guides the focuses reflected light L2 to the detector 410.

The detector 410 may include a time delay integration (TDI) sensor. The detector 410 receives the light emitted from the sample 500 illuminated by the illumination light L1. A region on the sample 500 detected by the detector 410 is called a visual field region 511. The detector 410 receives the reflected light L2 from the visual field region 511 illuminated by the illumination light L1. The visual field region 511 may be involved in the inspection region illuminated by the illumination light L1. The detector 410 acquires image data of the sample 500 such as the EUV mask. When the detector 410 includes the TDI sensor, the detector 410 includes a plurality of image sensors arranged in a line in one direction. Each of the image sensors is a charge coupled device (CCD), for example. The image sensor is not limited to the CCD. The plurality of image sensors of the TDI sensor will be described below.

The image data of the sample 500 acquired by the detector 410 is output to the image processing unit 420 and processed in the image processing unit 420. The image processing unit 420 may be, for example, an information processing apparatus such as a server or a personal computer.

The reflected light L2 contains information on defects in the sample 500. Specularly reflected light of the illumination light L1 incident on the sample 500 in the direction inclined with respect to the γ-axis direction is detected by the detection optics system 300. When defects exist in the sample 500, the defects are observed as dark images. Such an observation method is called a bright field observation. The inspection apparatus 1 may cause the illumination light L1 to be incident on the sample 500 from the γ-axis direction and cause the detection optics system 300 to detect the illumination light L1. When defects exist in the sample 500, the defects are observed as bright images. Such an observation method is called a dark field observation.

Illumination Apparatus

Figure 4:
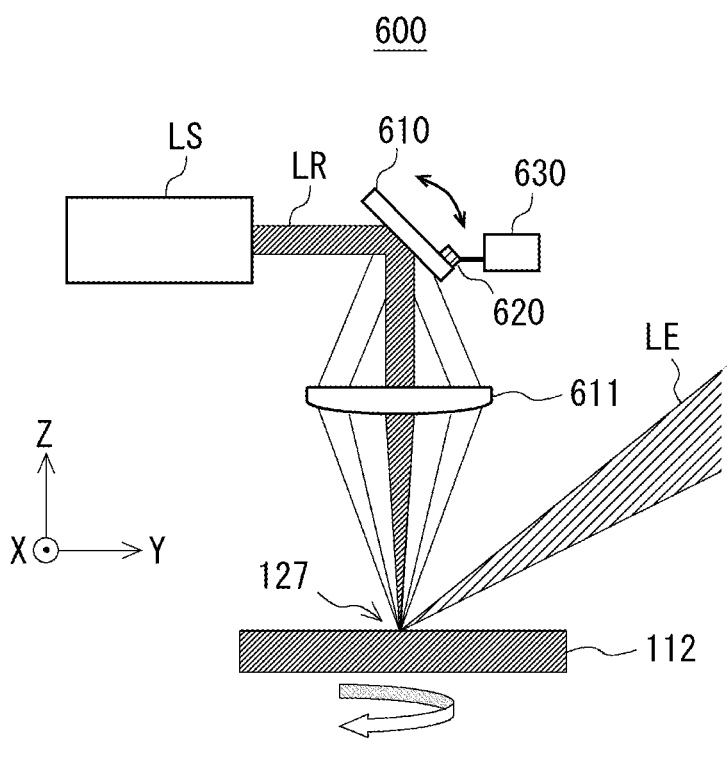
FIG. 4 is a configuration diagram illustrating an illumination apparatus according to the first embodiment.

FIG. 4 is a configuration diagram illustrating the illumination apparatus according to the first embodiment. As illustrated in FIGS. 1 and 4, the illumination apparatus 600 includes an optical member 610, a drive unit 620, and a control unit 630. The illumination apparatus 600 may further include another optical member such as a focusing lens 611.

The optical member 610 reflects the laser light LR generated by the exciting laser LS toward the target 112. Here, a plane parallel to the upper surface of the target 112 is defined as an XY-plane and a direction perpendicular to the XY-plane is defined as a Z-axis direction. The optical member 610 may include, for example, a mirror such as a piezo steering mirror. The optical member 610 is not limited to the piezo steering mirror, but may include a galvanometer mirror or a polygon mirror as long as it can reflect the laser light LR toward the target 112. The optical member 610 may reflect the laser light LR toward the target 112 via the focusing lens 611.

The drive unit 620 is an actuator, for example. The drive unit 620 drives the optical member 610 so as to change a direction of reflection of the optical member 610. The drive unit 620 performs beam scanning by varying the angle of the optical member 610 with respect to the laser light LR. Specifically, the drive unit 620 changes a reflective surface of the optical member 610 such that the laser light LR scans the target 112 in a predetermined direction, for example, in a Y-axis direction. The drive unit 620 may drive the optical member 610 such that the laser light LR is turned back on the Y-axis.

Figure 5:
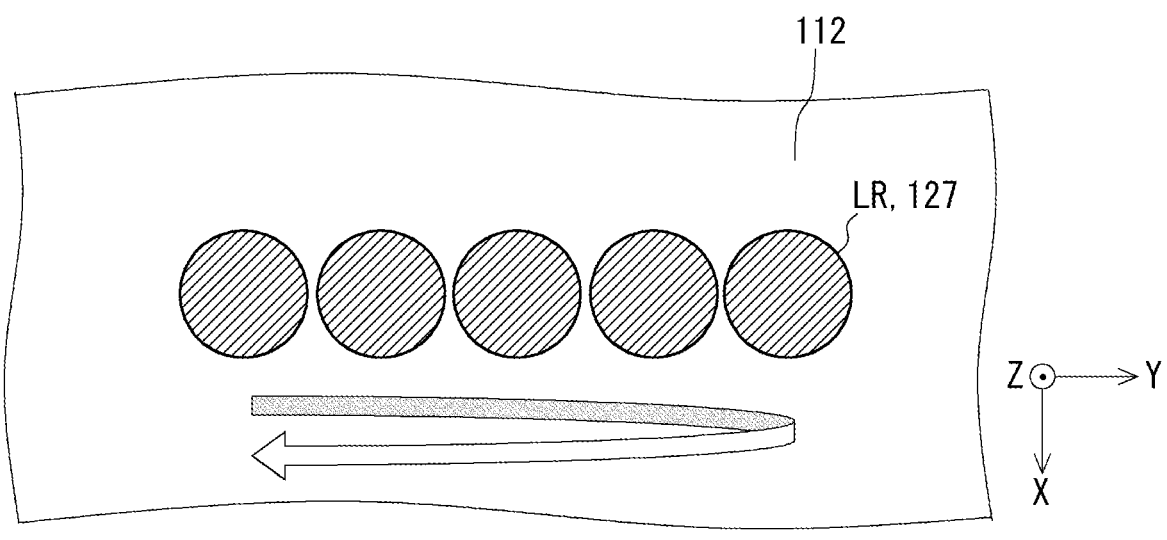
FIG. 5 is a diagram illustrating scanning of laser light and movement of plasma on a target according to the first embodiment.

The control unit 630 controls the operation of the drive unit 620. FIG. 5 is a diagram illustrating scanning of the laser light LR and movement of the plasma 127 on the target 112 according to the first embodiment. As illustrated in FIGS. 4 and 5, the drive unit 620 drives the optical member 610 such that the laser light LR scans the target 112 in the Y-axis direction. Therefore, a bright spot of the plasma 127 generated on the target 112 also moves in the scanning direction (Y-axis direction). Thereby, an intensity profile of the illumination light L1 containing the EUV light LE generated from the plasma 127 extends in the scanning direction. The illumination light L1 illuminates the sample 500 via the illumination optics system 200. Therefore, on the sample 500, the intensity profile of the illumination light L1 also extends in one direction.

Figure 6:
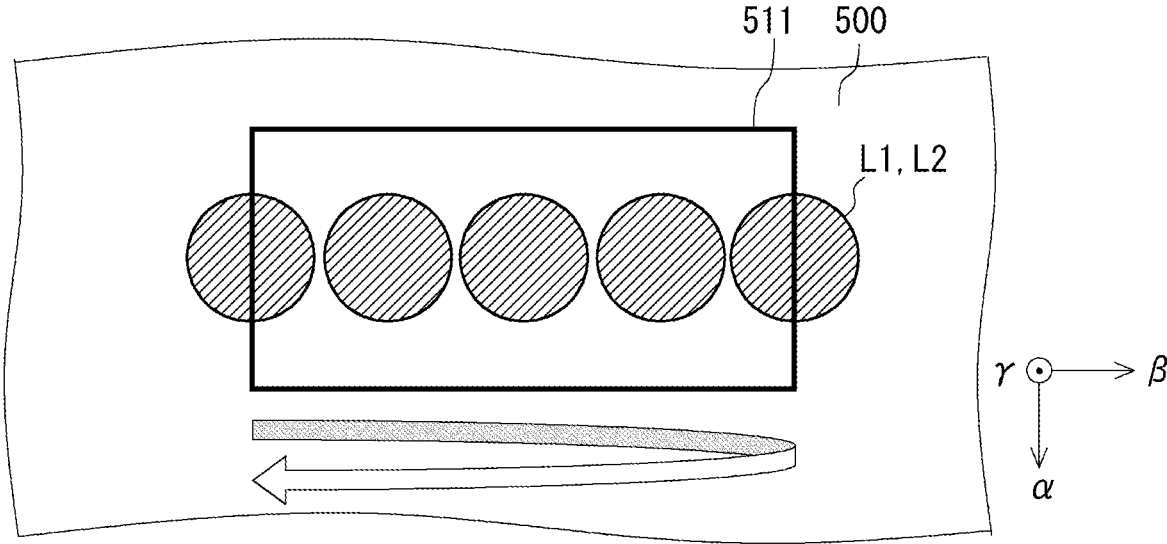
FIG. 6 is a diagram illustrating scanning of illumination light and movement of reflected light in a visual field region on a sample according to the first embodiment.

FIG. 6 is a diagram illustrating scanning of the illumination light L1 and movement of the reflected light L2 in the visual field region 511 on the sample 500 according to the first embodiment. As illustrated in FIG. 6, the illumination light L1 is scanned in one direction, for example, in a β-axis direction in the visual field region 511 on the sample 500 detected by the detector 410. The visual field region 511 is a region extending in the β-axis direction in the sample 500, and is a region detected by the detection surface 411 of the detector 410. In this way, the drive unit 620 drives the optical member 610 such that the laser light LR scans the target 112 in the Y-axis direction, whereby causing the illumination light L1 to scan the visual field region 511 in the β-axis direction. In other words, the drive unit 620 drives the optical member 610 such that the illumination light L1 scans the visual field region 511 in the β-axis direction.

Figure 7:
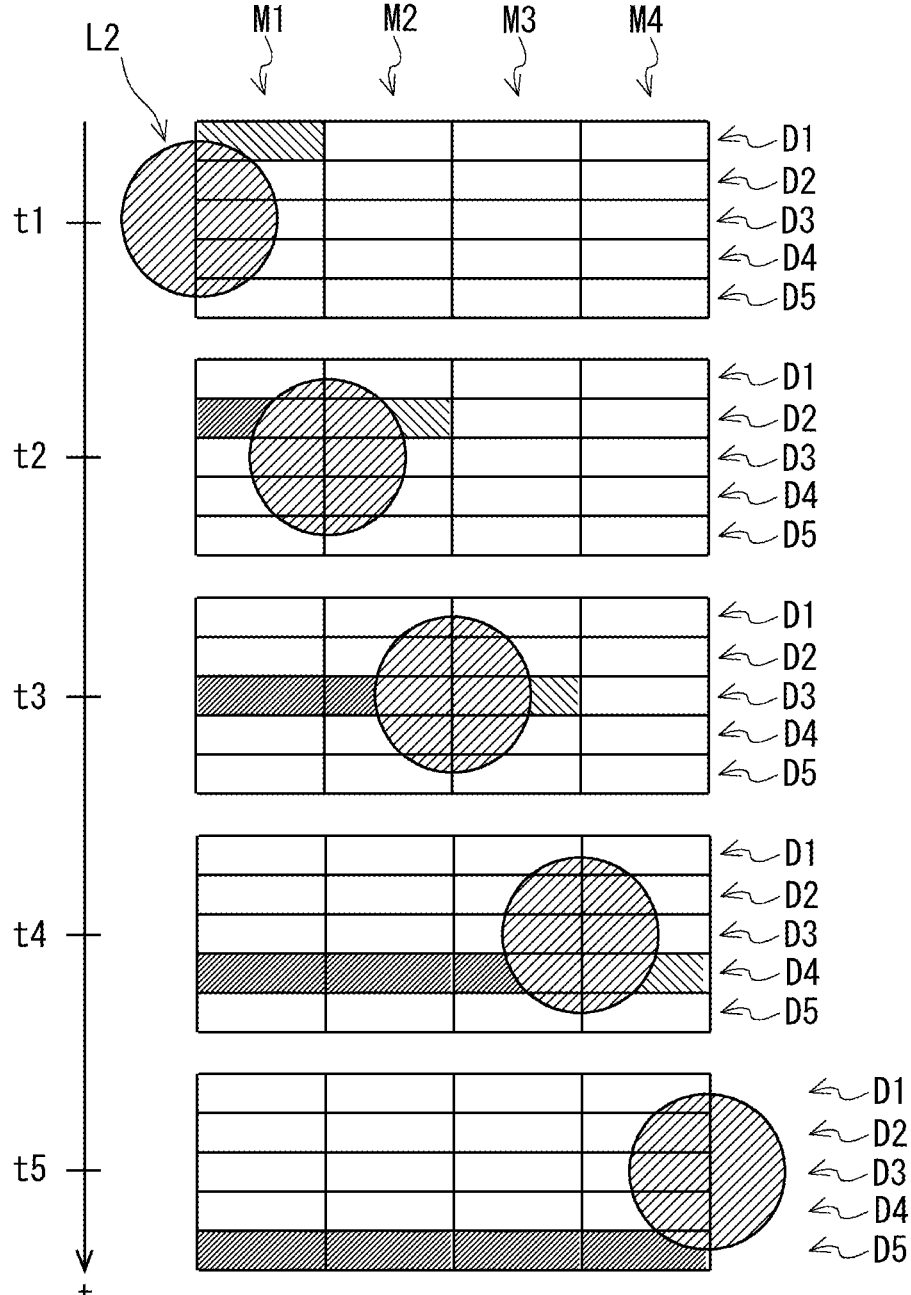
FIG. 7 is a diagram illustrating movement of the reflected light from the visual field region in a detection surface according to the first embodiment.

FIG. 7 is a diagram illustrating movement of the reflected light L2 from the visual field region 511 in the detection surface 411 according to the first embodiment. As illustrated in FIG. 7, when the detector 410 includes the TDI sensor, the detector 410 includes a plurality of image sensors M1 to M4 arranged in a line in one direction. The plurality of image sensors M1 to M4 arranged in a line are called an image sensor array. Therefore, the detector 410 includes a plurality of image sensor arrays D1 to D5 arranged in another direction orthogonal to the one direction. Each of the image sensor arrays D1 to D5 includes the plurality of image sensors M1 to M4. The number of image sensors illustrated in the drawing is for convenience of description and is an example.

The control unit 630 controls the scanning of the laser light LR on the target 112 so as to synchronize the scanning with an integration cycle of the TDI sensor. Thereby, the control unit 630 can control the drive unit 620 so as to synchronize the scanning of the illumination light L1 in the visual field region 511 with the integration cycle of the TDI sensor. Specifically, the illumination light L1, illuminating the sample 500, moves in the β-axis direction so as to synchronize the integration cycle of the TDI sensor. The TDI sensor integrates the reflected light L2 received by the detection surface 411 during a transfer time t (=t1 to t5). For example, the integration cycle is a cycle in which the quantity of the reflected light L2 received by each of the image sensors M1 to M4 in the plurality of image sensor arrays D1 to D5 in the detection surface 411 is integrated.

At time t=t1, the reflected light L2 detected by the detector 410 including the TDI sensor is received by the image sensor M1 in the image sensor array D1. Therefore, the image sensor M1 in the image sensor array D1 retains the quantity of received light.

At time t=t2, the reflected light L2 detected by the detector 410 including the TDI sensor is received by the image sensors M1 and M2 in the image sensor array D2. Therefore, the image sensors M1 and M2 in the image sensor array D2 retain the quantity of received light. Further, the quantity of light retained by the image sensor M1 in the image sensor array D1 at time t=t1 is transferred to the image sensor M1 in the image sensor array D2.

At time t=t3, the reflected light L2 detected by the detector 410 including the TDI sensor is received by the image sensors M2 and M3 in the image sensor array D3. Therefore, the image sensors M2 and M3 in the image sensor array D3 retain the quantity of received light. Further, the quantity of light retained by the image sensors M1 and M2 in the image sensor array D2 at time t=t2 is transferred to the image sensors M1 and M2 in the image sensor array D3.

At time t=t4, the reflected light L2 detected by the detector 410 including the TDI sensor is received by the image sensors M3 and M4 in the image sensor array D4. Therefore, the image sensors M3 and M4 in the image sensor array D4 retain the quantity of received light. Further, the quantity of light retained by the image sensors M1 to M3 in the image sensor array D3 at time t=t3 is transferred to the image sensors M1 to M3 in the image sensor array D4.

At time t=t5, the reflected light L2 detected by the detector 410 including the TDI sensor is received by the image sensor M4 in the image sensor array D5. Therefore, the image sensor M4 in the image sensor array D5 retain the quantity of received light. Further, the quantity of light retained by the image sensors M1 to M4 in the image sensor array D4 at time t=t4 is transferred to the image sensors M1 to M4 in the image sensor array D5. Thereby, the integration of the TDI sensor is completed. This is one-time integration cycle. During this time, the laser light LR scans the target 112 once in the Y-axis direction. Along with this, the illumination light L1 scans the visual field region 511 once in the β-axis direction.

The laser light LR may scan the target 112 in the Y-axis direction two or more integer number of times in one-time integration cycle. Along with this, the illumination light L1 may scan the visual field region 511 in the β-axis direction two or more integer number of times.

In this way, the control unit 630 causes the drive unit 620 to operate in synchronization with the integration cycle of the TDI sensor. The control unit 630 causes the drive unit 620 to scan the visual field region 511 one or more times, more specifically, an integer number of times, until the integration of the TDI sensor is completed. Thereby, the visual field region 511 detected by the detector 410 can be illuminated with the uniform illumination light L1. For example, such an operation can be performed by synchronization of the drive unit 620 such as a mirror actuator with a clock of the TDI camera.

For example, assuming that a TDI with an integration number of stages of 1000 is driven at a transfer rate of 100 KHz, a synchronization frequency will be 100 Hz (=100 KHz/1000 stages). This is a frequency at the time of round-trip scanning. Since it is sufficient to perform one-way scanning, the minimum required frequency is 50 Hz, which is half that. This value is defined as the minimum unit, and the bright spot of the plasma 127 is scanned at a frequency that is an integral multiplication of this value. Thereby, it is possible to form the illumination light L1 having an effectively flat brightness profile.

It is desirable that the illumination light L1 illuminating the visual field region 511 move at a constant velocity in the β-axis direction in the visual field region 511. Therefore, it is desirable that the bright spot of the plasma 127 move at a constant velocity on the target 112 in the Y-axis direction. For example, the control unit 630 controls the operation of the drive unit 620 using a triangular wave.

Figure 8:
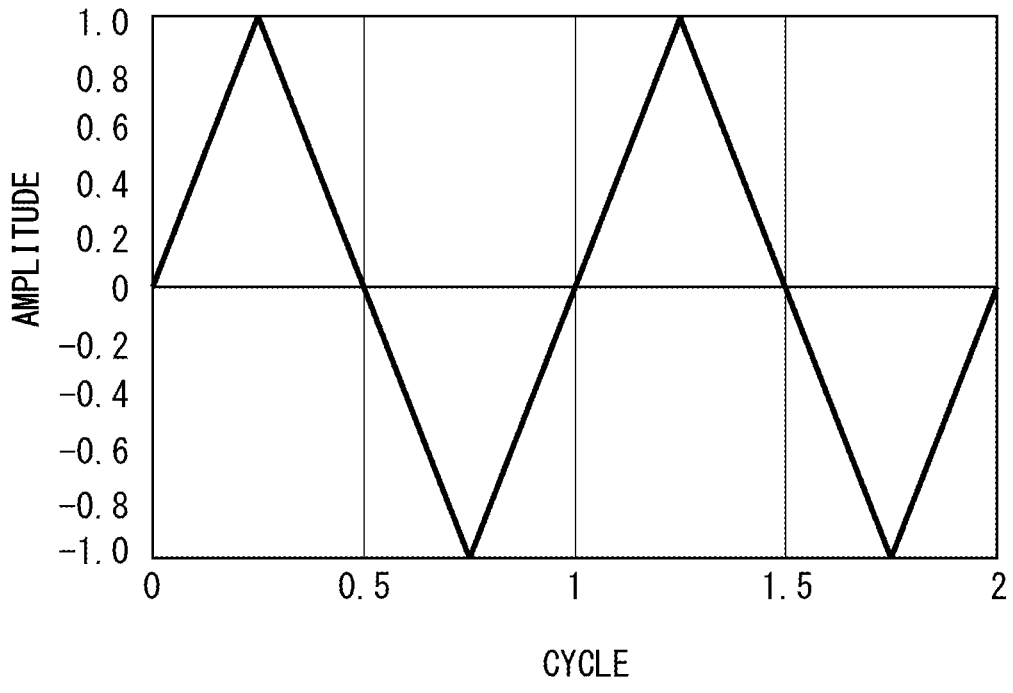
FIG. 8 is a graph illustrating a triangular wave according to the first embodiment, in which a horizontal axis represents time and a vertical axis represents amplitude.

FIG. 8 is a graph illustrating a triangular wave according to the first embodiment, in which a horizontal axis represents time and a vertical axis represents amplitude. In FIG. 8, the vertical axis represents a position in the Y-axis direction of the laser light LR on the target 112. As illustrated in FIG. 8, the control unit 630 controls the drive unit 620 such that a relationship between the position of the laser light LR on the target 112 and the time involves a triangular wave. Thereby, the drive unit 620 drives the optical member 610 such that the relationship between the position of the laser light LR on the target 112 and the time involves the triangular wave. In other words, when the position on the target 112 in the Y-axis direction is made to correspond to the amplitude, the control unit 630 controls the position of the laser light LR to scan at a constant velocity in the Y-axis direction. Thereby, it is possible to form a flat brightness profile of the plasma 127 in the target 112. Accordingly, it is possible to form a flat intensity profile of the illumination light L1 in the visual field region 511.

The TDI sensor in the detector 410 may integrate the quantity of reflected light L2 during scanning of the laser light LR in a +Y-axis direction, or may integrate the quantity of reflected light L2 during scanning of the laser light LR in a −Y-axis direction. Further, the TDI sensor in the detector 410 may integrate the quantity of reflected light L2 during scanning of the laser light LR in both the +Y-axis direction and the −Y-axis direction.

Figure 9:
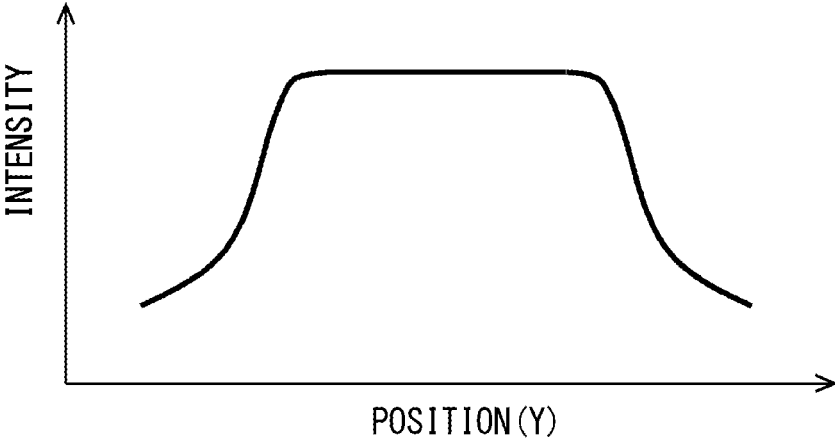
FIG. 9 is a graph illustrating a profile of plasma on the target when the relationship between a position of the laser light on the target according to the first embodiment and time is controlled to involve a triangular wave, in which a horizontal axis represents a position on the target and a vertical axis represents an intensity of EUV light generated from the plasma.
Figure 10:
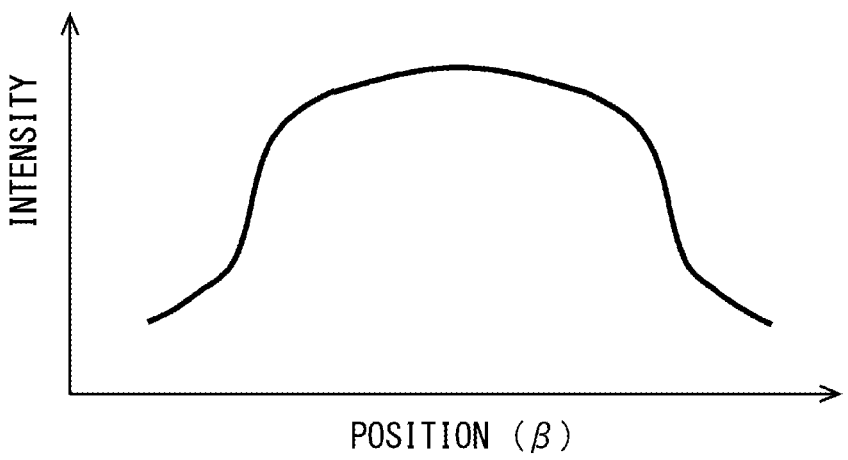
FIG. 10 is a graph illustrating a profile of the illumination light on the sample when the relationship between the position of the laser light on the target according to the first embodiment and the time is controlled to involve a triangular wave, in which a horizontal axis represents a position on the sample and a vertical axis represents an intensity of the illumination light.

FIG. 9 is a graph illustrating a profile of the plasma 127 on the target 112 when the relationship between the position of the laser light LR on the target 112 according to the first embodiment and the time is controlled to involve a triangular wave, in which a horizontal axis represents a position on the target 112 and a vertical axis represents an intensity of the EUV light LE generated from the plasma 127. FIG. 10 is a graph illustrating a profile of the illumination light L1 on the sample 500 when the relationship between the position of the laser light LR on the target 112 according to the first embodiment and the time is controlled to involve a triangular wave, in which a horizontal axis represents a position on the sample 500 and a vertical axis represents an intensity of the illumination light L1.

As illustrated in FIG. 9, when the irradiation position of the laser light LR is controlled to involve a triangular wave, the profile of the plasma 127 on the target 112 can be made flat. However, as illustrated in FIG. 10, there is a case where the profile of the illumination light L1 on the sample 500 may be out of flat. For example, the profile of the illumination light L1 on the sample 500 has a protrusion shape at the center of the visual field region 511, and has decrease portions at both ends of the visual field region 511. This is considered to be caused by a slope error caused by the illumination light L1 being repeatedly reflected and transmitted by the optical member of the illumination optics system 200. Therefore, the control unit 630 controls the operation of the drive unit 620 such that the relationship between the position of the laser light LR on the target 112 and the time involves a wave in which a triangular wave and a sine wave overlap. Thereby, the drive unit 620 drives the optical member 610 such that the relationship between the position of the laser light LR on the target 112 and the time involves the wave in which the triangular wave and the sine wave overlap.

Figure 11:
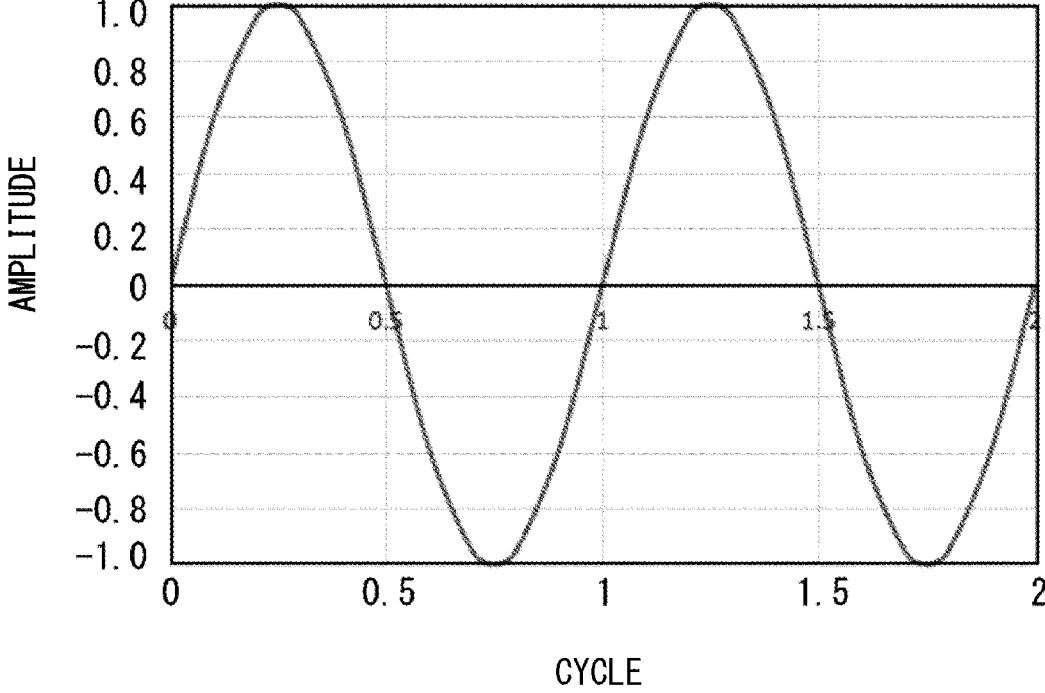
FIG. 11 is a graph illustrating a sine wave according to the first embodiment, in which a horizontal axis represents time and a vertical axis represents amplitude.
Figure 12:
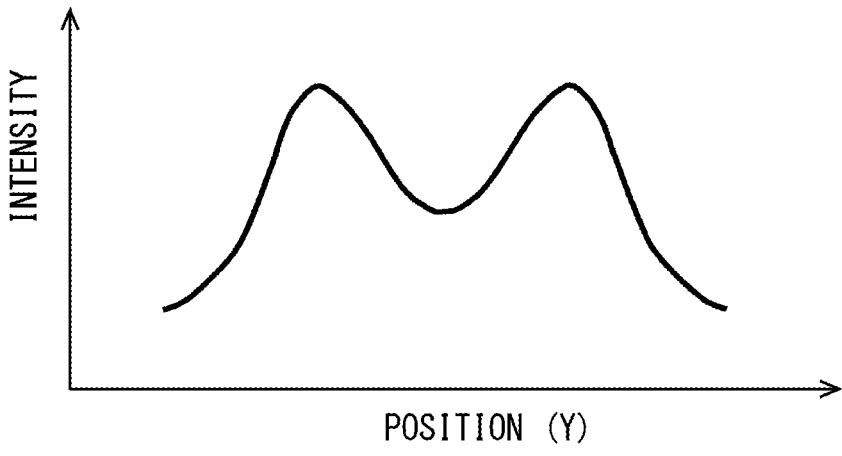
FIG. 12 is a graph illustrating a profile of plasma on the target when the relationship between a position of the laser light on the target according to the first embodiment and time is controlled to involve a sine wave, in which a horizontal axis represents a position on the target and a vertical axis represents an intensity of EUV light generated from the plasma.
Figure 13:
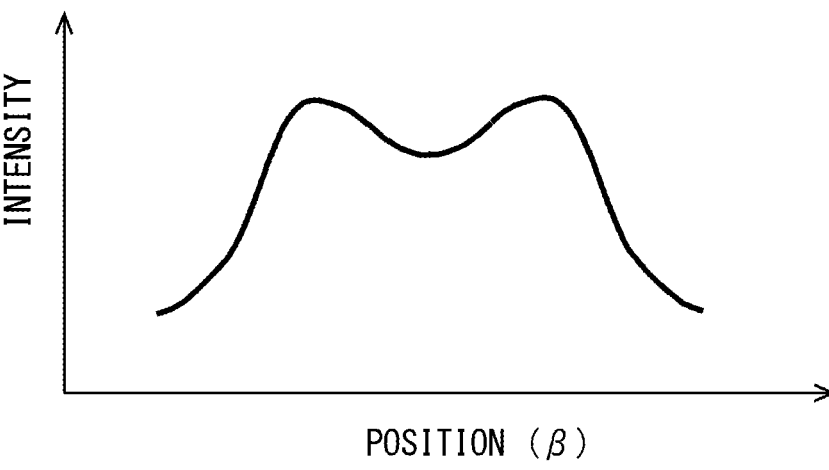
FIG. 13 is a graph illustrating a profile of the illumination light on the sample when the relationship between the position of the laser light on the target according to the first embodiment and the time is controlled to involve a sine wave, in which a horizontal axis represents a position on the sample and a vertical axis represents an intensity of the illumination light.

FIG. 11 is a graph illustrating a sine wave according to the first embodiment, in which a horizontal axis represents time and a vertical axis represents amplitude. In FIG. 11, the vertical axis represents a position in the Y-axis direction of the laser light LR on the target 112. FIG. 12 is a graph illustrating a profile of the plasma 127 on the target 112 when the relationship between the position of the laser light LR on the target 112 according to the first embodiment and the time is controlled to involve a sine wave, in which a horizontal axis represents a position on the target 112 and a vertical axis represents an intensity of the EUV light LE generated from the plasma 127. FIG. 13 is a graph illustrating a profile of the illumination light L1 on the sample 500 when the relationship between the position of the laser light LR on the target 112 according to the first embodiment and the time is controlled to involve a sine wave, in which a horizontal axis represents a position on the sample 500 and a vertical axis represents an intensity of the illumination light L1.

As illustrated in FIGS. 11 and 12, when the irradiation position of the laser light LR is controlled to involve a sine wave, the profile of the plasma 127 on the target has protrusions at both ends and a recess at the center. In the case of a sine wave, since the speed of movement in the vicinity of turning points at both ends decreases, the profile has protrusions at both ends. As illustrated in FIG. 13, when the irradiation position of the laser light LR is controlled to involve a sine wave, the difference in the profile of the illumination light L1 on the sample 500 between the protrusions at both ends and the recess at the center is reduced. Therefore, by controlling the relationship between the position of the laser light LR on the target 112 and the time to involve the wave in which the triangular wave and the sine wave overlap, the profile of the illumination light L1 on the sample 500 can made close to flat. In this way, when the relationship between the position of the laser light LR on the target 112 and the time is made to involve the wave in which the triangular wave and the sine wave overlap, the illumination light L1 on the sample 500 can be adjusted to be flat, taking into account the slope error. The drive unit 620 may drive the optical member 610 such that the relationship between the position of the laser light LR on the target 112 and the time involves at least one of the three waveforms: triangular wave, sine wave, rectangular wave, or a combined and overlapped waveform of any of those three waveforms.

Figure 14:
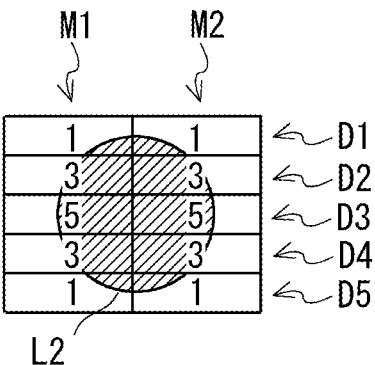
FIG. 14 is a diagram illustrating a shape of a spot of the reflected light emitted from the visual field region on the detection surface according to the first embodiment.

FIG. 14 is a diagram illustrating a shape of a spot of the reflected light L2 emitted from the visual field region 511 on the detection surface 411 according to the first embodiment. When a shape of a spot of the laser light LR on the target 112 is circular, a shape of a spot of the illumination light L1 in the visual field region 511 is also circular. As a result, as illustrated in FIG. 14, the spot of the reflected light L2 on the detection surface 411 of the detector 410 also becomes circular. The reflected light L2 emitted from the visual field region 511 is received by the image sensors M1 and M2 in the image sensor arrays D1 to D5, for example. In this case, each of the image sensors M1 and M2 in the image sensor array D1 receives reflected light L2 with intensity I=1. Each of the image sensors M1 and M2 in the image sensor array D2 receives reflected light L2 with intensity I=3. Each of the image sensors M1 and M2 in the image sensor array D3 receives reflected light L2 with intensity I=5. Each of the image sensors M1 and M2 in the image sensor array D4 receives reflected light L2 with intensity I=3. Each of the image sensors M1 and M2 in the image sensor array D5 receives reflected light L2 with intensity I=1.

Figure 15:
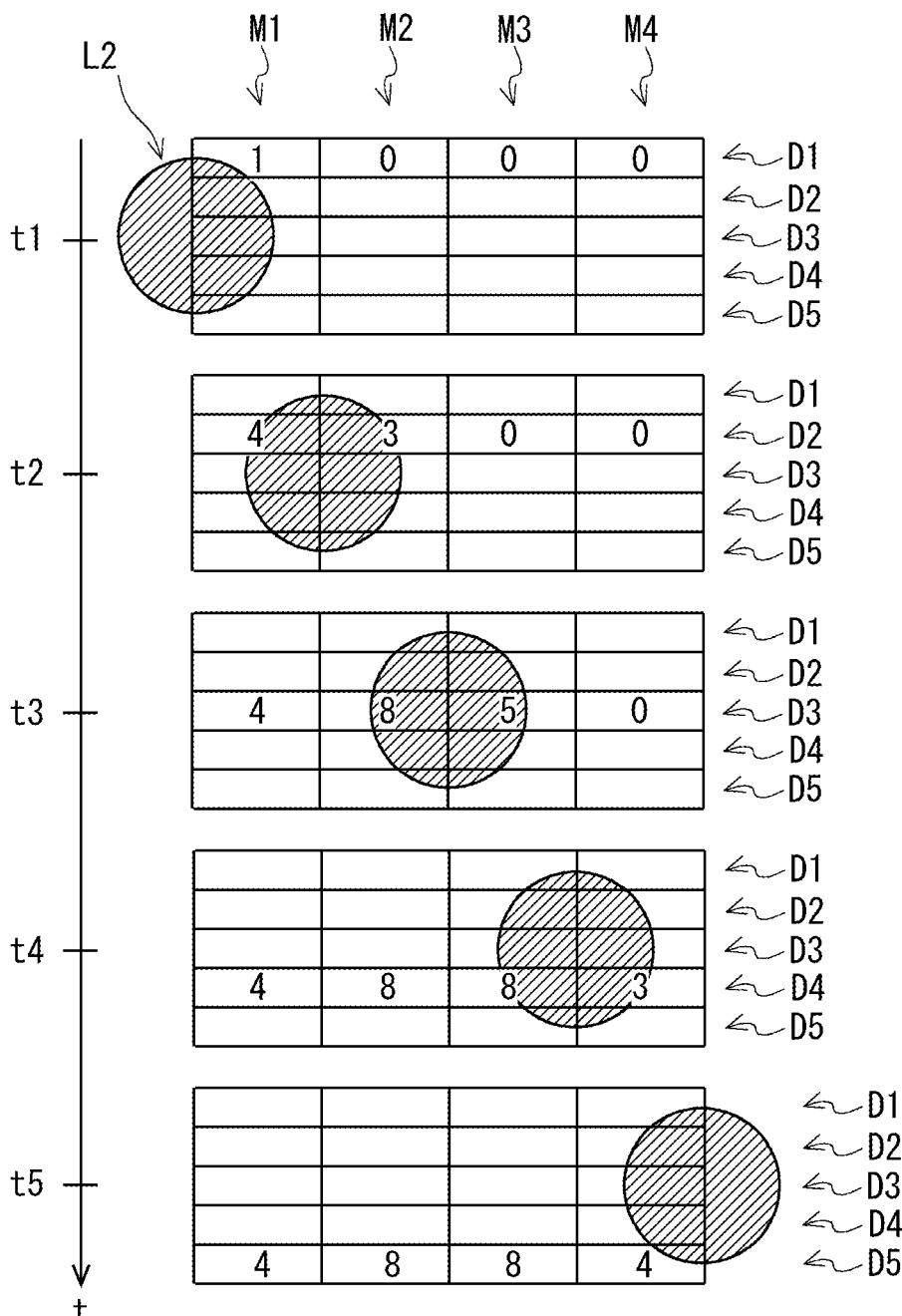
FIG. 15 is a diagram illustrating movement of the reflected light from the visual field region in the detection surface according to the first embodiment.

FIG. 15 is a diagram illustrating movement of the reflected light L2 from the visual field region 511 in the detection surface 411 according to the first embodiment. As illustrated in FIG. 15, at time t=t1, the reflected light L2 detected by the detector 410 including the TDI sensor is received by the image sensor M1 in the image sensor array D1. The image sensor M1 in the image sensor array D1 retains the quantity of received light with intensity I=1.

At time t=t2, the reflected light L2 detected by the detector 410 including the TDI sensor is received by the image sensors M1 and M2 in the image sensor array D2. Therefore, the image sensors M1 and M2 in the image sensor array D2 retain the quantity of received light with intensity I=3. Further, the quantity of light with intensity I=1 retained by the image sensor M1 in the image sensor array D1 at time t=t1 is transferred to the image sensor M1 in the image sensor array D2. Thereby, the image sensor M1 in the image sensor array D2 retains the quantity of light with intensity I=4.

At time t=t3, the reflected light L2 detected by the detector 410 including the TDI sensor is received by the image sensors M2 and M3 in the image sensor array D3. Therefore, the image sensors M2 and M3 in the image sensor array D3 retain the quantity of received light with intensity I=5. Further, the quantities of light with intensity I=4 and I=3 retained by the image sensors M1 and M2 in the image sensor array D2 at time t=t2 are transferred to the image sensors M1 and M2 in the image sensor array D3, respectively. Thereby, the image sensor M2 in the image sensor array D3 retains the quantity of light with intensity I=8. The image sensor M1 in the image sensor array D3 retains the quantity of light with intensity I=4.

At time t=t4, the reflected light L2 detected by the detector 410 including the TDI sensor is received by the image sensors M3 and M4 in the image sensor array D4. Therefore, the image sensors M3 and M4 in the image sensor array D4 retain the quantity of received light with intensity I=3. Further, the quantity of light retained by the image sensors M1 to M3 in the image sensor array D3 at time t=t3 is transferred to the image sensors M1 to M3 in the image sensor array D4. Thereby, the image sensor M3 in the image sensor array D4 retains the quantity of light with intensity I=8. The image sensor M1 in the image sensor array D4 retains the quantity of light with intensity I=4. The image sensor M2 in the image sensor array D4 retains the quantity of light with intensity I=8.

At time t=t5, the reflected light L2 detected by the detector 410 including the TDI sensor is received by the image sensor M4 in the image sensor array D5. Therefore, the image sensor M4 in the image sensor array D5 retains the quantity of received light with intensity I=1. Further, the quantity of light retained by the image sensors M1 to M4 in the image sensor array D4 at time t=t4 is transferred to the image sensors M1 to M4 in the image sensor array D5. Thereby, the image sensor M4 in the image sensor array D5 retains the quantity of light with intensity I=4. The image sensor M1 in the image sensor array D5 retains the quantity of light with intensity I=4. The image sensor M2 in the image sensor array D5 retains the quantity of light with intensity I=8. The image sensor M3 in the image sensor array D5 retains the quantity of light with intensity I=8. Thereby, the integration of the TDI sensor is completed, and the integration cycle ends.

When the number of scans is small, the intensity difference in the vertical direction (α-axis direction) of the illumination light L1 is converted into an intensity distribution in the horizontal direction (β-axis direction). Specifically, the intensity distribution of the illumination light L1 in the α-axis direction is converted into the intensity distribution of the image sensor array in the β-axis direction. Therefore, the spot of the illumination light L1 in the visual field region 511 is vertically long, that is, long in the other direction (α-axis direction). This reduces an intensity difference in the β-axis direction.

Figure 16:
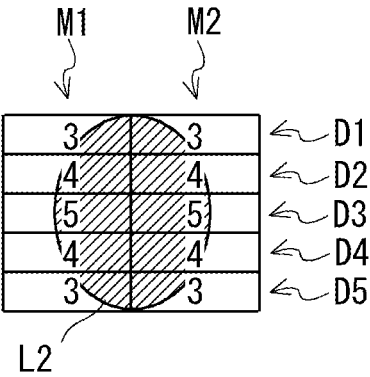
FIG. 16 is a diagram illustrating a shape of a spot of the reflected light emitted from the visual field region on the detection surface according to another example of the first embodiment.

FIG. 16 is a diagram illustrating a shape of a spot of the reflected light L2 emitted from the visual field region 511 on the detection surface 411 according to another example of the first embodiment. The shape of the spot of the laser light LR on the target 112 is vertically long. In this case, the shape of the spot of the illumination light L1 in the visual field region 511 is also vertically long. Specifically, the shape of the spot of the illumination light L1 in the visual field region 511 is an ellipse whose major axis extends in the other direction (α-axis direction) orthogonal to one direction (β-axis direction). As a result, as illustrated in FIG. 16, the spot of the reflected light L2 on the detection surface 411 of the detector 410 also becomes vertically long.

The reflected light L2 emitted from the visual field region 511 is received by the image sensors M1 and M2 in the image sensor arrays D1 to D5, for example. Each of the image sensors M1 and M2 in the image sensor array D1 receives reflected light L2 with intensity I=3. Each of the image sensors M1 and M2 in the image sensor array D2 receives reflected light L2 with intensity I=4. Each of the image sensors M1 and M2 in the image sensor array D3 receives reflected light L2 with intensity I=5. Each of the image sensors M1 and M2 in the image sensor array D4 receives reflected light L2 with intensity I=4. Each of the image sensors M1 and M2 in the image sensor array D5 receives reflected light L2 with intensity I=4.

Figure 17:
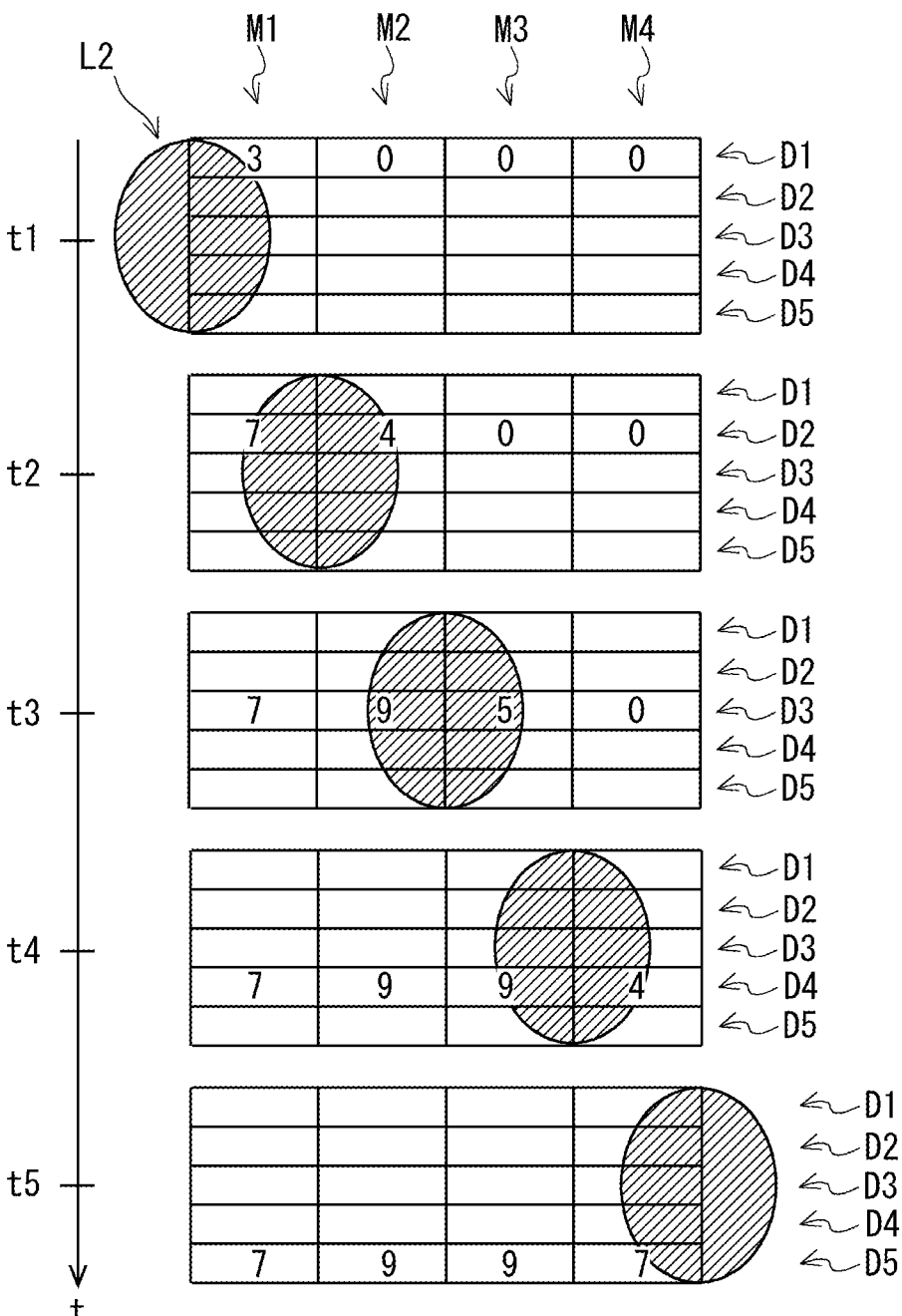
FIG. 17 is a diagram illustrating movement of the reflected light from the visual field region in the detection surface according to another example of the first embodiment.

FIG. 17 is a diagram illustrating movement of the reflected light L2 from the visual field region 511 in the detection surface 411 according to another example of the first embodiment. As illustrated in FIG. 17, at time t=t1, the reflected light L2 detected by the detector 410 including the TDI sensor is received by the image sensor M1 in the image sensor array D1. The image sensor M1 in the image sensor array D1 retains the quantity of received light with intensity I=3.

At time t=t2, the reflected light L2 detected by the detector 410 including the TDI sensor is received by the image sensors M1 and M2 in the image sensor array D2. Therefore, the image sensors M1 and M2 in the image sensor array D2 retain the quantity of received light with intensity I=4. Further, the quantity of light with intensity I=3 retained by the image sensor M1 in the image sensor array D1 at time t=t1 is transferred to the image sensor M1 in the image sensor array D2. Thereby, the image sensor M1 in the image sensor array D2 retains the quantity of light with intensity I=7.

At time t=t3, the reflected light L2 detected by the detector 410 including the TDI sensor is received by the image sensors M2 and M3 in the image sensor array D3. Therefore, the image sensors M2 and M3 in the image sensor array D3 retain the quantity of received light with intensity I=5. Further, the quantities of light with intensity I=7 and I=4 retained by the image sensors M1 and M2 in the image sensor array D2 at time t=t2 are transferred to the image sensors M1 and M2 in the image sensor array D3, respectively. Thereby, the image sensor M2 in the image sensor array D3 retains the quantity of light with intensity I=9. The image sensor M1 in the image sensor array D3 retains the quantity of light with intensity I=7.

At time t=t4, the reflected light L2 detected by the detector 410 including the TDI sensor is received by the image sensors M3 and M4 in the image sensor array D4. Therefore, the image sensors M3 and M4 in the image sensor array D4 retain the quantity of received light with intensity I=4. Further, the quantity of light retained by the image sensors M1 to M3 in the image sensor array D3 at time t=t3 is transferred to the image sensors M1 to M3 in the image sensor array D4. Thereby, the image sensor M3 in the image sensor array D4 retains the quantity of light with intensity I=9. The image sensor M1 in the image sensor array D4 retains the quantity of light with intensity I=7. The image sensor M2 in the image sensor array D4 retains the quantity of light with intensity I=9.

At time t=t5, the reflected light L2 detected by the detector 410 including the TDI sensor is received by the image sensor M4 in the image sensor array D5. Therefore, the image sensor M4 in the image sensor array D5 retains the quantity of received light with intensity I=3. Further, the quantity of light retained by the image sensors M1 to M4 in the image sensor array D4 at time t=t4 is transferred to the image sensors M1 to M4 in the image sensor array D5. Thereby, the image sensor M4 in the image sensor array D5 retains the quantity of light with intensity I=7. The image sensor M1 in the image sensor array D5 retains the quantity of light with intensity I=7. The image sensor M2 in the image sensor array D5 retains the quantity of light with intensity I=9. The image sensor M3 in the image sensor array D5 retains the quantity of light with intensity I=9. Thereby, the integration of the TDI sensor is completed, and the integration cycle ends.

When the shape of the spot in the illumination light L1 described above is circular, the light quantity of the image sensors M2 and M3 is twice that of the image sensors M1 and M4. In other words, the light quantity ratio of the illumination light L1 between the center and the end in the visual field region 511 is twice. In contrast, when the shape of the spot in the illumination light L1 is a vertically long ellipse, the light quantity of the image sensors M2 and M3 is 1.2 times that of the image sensors M1 and M4. Therefore, the light quantity ratio of the illumination light L1 between the center and the end in the visual field region 511 can be reduced to 1.2 times. Accordingly, the visual field region 511 can be illuminated more uniformly.

Figure 18:
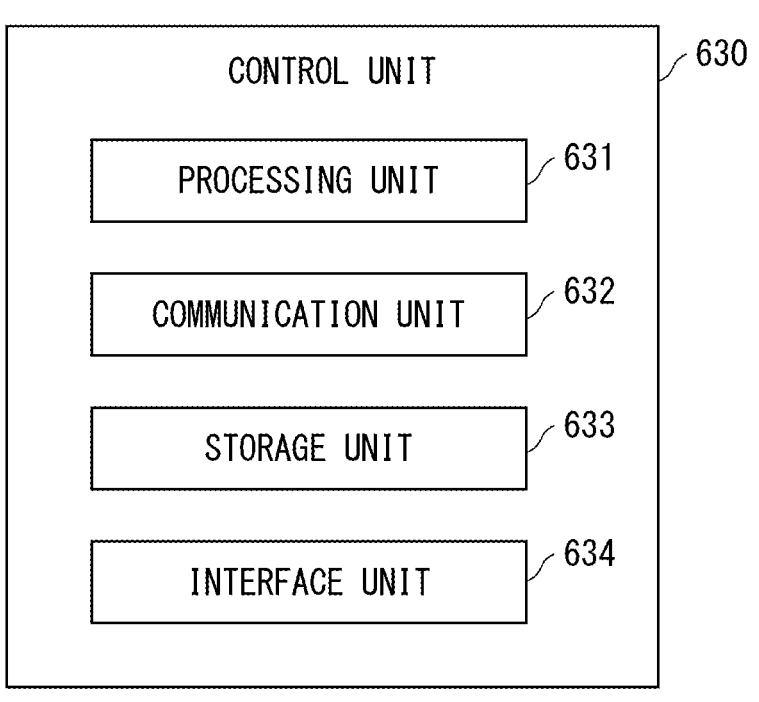
FIG. 18 is a block diagram illustrating a control unit in the illumination apparatus according to the first embodiment.

The control unit 630 may be an information processing apparatus such as a server or a personal computer. FIG. 18 is a block diagram illustrating the control unit 630 in the illumination apparatus 600 according to the first embodiment. As illustrated in FIG. 18, the control unit 630 includes a processing unit 631, a communication unit 632, a storage unit 633, and an interface unit 634. The processing unit 631, the communication unit 632, the storage unit 633, and the interface unit 634 have functions as processing means, communication means, storage means, and interface means, respectively.

The processing unit 631 includes processors, for example, a CPU (Central Processing Unit), an MPU (Micro Processing Unit), an ECU (Electronic Control Unit), an FPGA (Field-Programmable Gate Array), and an ASIC (Application Specific Integrated Circuit). The processing unit 631 has a function as an arithmetic unit that performs processing, arithmetic processing, and the like. In addition, the processing unit 631 controls operations of components for executing functions of the communication unit 632, the storage unit 633, the interface unit 634, and respective apparatuses.

Each of the components of the control unit 630 can be implemented when a program is executed under control of the processing unit 631, for example. More specifically, each of the components can be implemented when a program stored in the storage unit 633 is executed by the processing unit 631. Further, each of the components may be implemented when a necessary program is recorded in any nonvolatile recording medium and is installed as necessary. In addition, each of the components may be implemented by any combination of hardware, firmware, and software, without being limited to being implemented with software by a program.

The communication unit 632 performs communication necessary for the control unit 630 to perform control. The storage unit 633 is, for example, a ROM (Read Only Memory) or a RAM (Random Access Memory). The storage unit 633 has a function of storing a control program, an arithmetic program, and the like executed by the processing unit 631.

The interface unit 634 is, for example, a user interface. The interface unit 634 is connected to input means such as a keyboard, a touch panel, or a mouse, and output means such as a display or a speaker. The interface unit receives a data input operation from a user (for example, an operator), and outputs information to the user.

Figure 19:
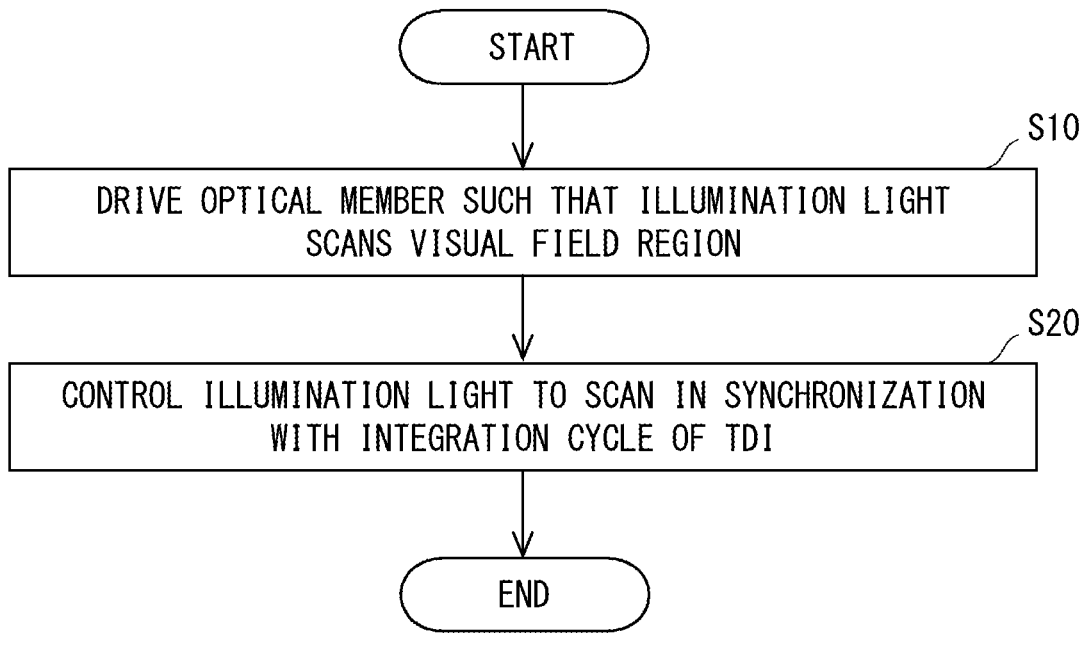
FIG. 19 is a flowchart illustrating an illumination method according to the first embodiment.

Next, an illumination method will be described. FIG. 19 is a flowchart illustrating an illumination method according to the first embodiment. As indicated by step S10 in FIG. 19, the optical member 610 is driven such that the illumination light L1 scans the visual field region 511. Specifically, the control unit 630 causes the drive unit 620 to drive the optical member 610 such that the illumination light L1 scans the visual field region 511, which extends in the β-axis direction in the sample 500, in the β-axis direction.

Next, as indicated by step S20, the scanning of the illumination light L1 is controlled to synchronize with the integration cycle of the TDI sensor. Specifically, the control unit 630 controls the scanning of the illumination light L1 to synchronize with the integration cycle of the TDI sensor that receives the light from the visual field region 511 illuminated by the illumination light L1.

The illumination light L1 may contain the EUV light LE generated from the plasma 127 generated by irradiation of the target 112 with the laser light LR. The optical member 610 may include the mirror that reflects the laser light LR toward the target 112. Then, in step S10 of driving the optical member 610, the optical member 610 is driven such that the laser light LR scans the target 112 in the Y-axis direction, whereby the illumination light L1 may scan the visual field region 511 in the β-axis direction.

In step S10 of driving the optical member 610, the optical member 610 may be driven such that the relationship between the position of the laser light LR on the target 112 and the time involves a triangular wave. Further, the optical member 610 may be driven such that the relationship between the position of the laser light LR on the target 112 and the time involves a wave in which a triangular wave and a sine wave overlap.

Next, effects of the present embodiment will be described. The illumination apparatus 600 of the present embodiment synchronizes the scanning of the illumination light L1 in the visual field region 511 with the integration cycle of the TDI sensor. For example, the scanning of the illumination light L1 synchronizes with the integration time of the TDI sensor. Thereby, a uniform illumination profile covering the visual field region 511 can be realized by bright spot movement of the plasma 127 due to scanning of the optical member 610 such as a mirror. Accordingly, the visual field region 511 detected by the detector 410 can be uniformly illuminated.

In addition, since the illumination profile in the visual field region 511 can be made flat and the quantity of light can be reduced in regions other than the visual field region 511, the utilization efficiency of the illumination light L1 can be improved.

When the bright spot of the plasma 127 can be made to reciprocate a plurality of times within one integration time, from the effect of multi-stage integration, it is possible to average brightness fluctuations from pulse to pulse and improve stability.

When a plurality of exciting lasers LS are used, it is possible to average differences in brightness of the illumination light L1 due to machine differences.

By adjusting the stroke amount of angle change of the optical member 610, it is possible to adjust the quantity of light emitting out of the visual field region 511. Therefore, it is possible to easily make adjustments, such as increasing components outside the visual field region 511 to increase the stability of the quantity of light, or adjusting the amount of movement to fill the visual field region 511 to increase efficiency.

The drive unit 620 may generate the EUV light LE by causing the laser light LR to scan the target 112, and in this case, it is possible to use the illumination light L1 containing the EUV light LE and to apply to the inspection apparatus and the exposure apparatus using the EUV light LE.

When the optical member 610 is scanned according to the triangular wave, the profile of the illumination light L1 can be made flat. Further, when the optical member 610 is scanned according to the overlapping of the triangular wave and the sine wave, the slope error of the illumination optics system 200 can be reduced. For example, since the illumination shape is blurred due to the slope error in the optical system, the scanning waveform is closer to the sine wave rather than the triangular wave, and thus the illumination shape can be optimized.

The intensity distribution of the cross section orthogonal to the optical axis of the illumination light L1 may be a simple Gaussian profile, thereby making it possible to simplify the optical system.

When the scanning speed of the illumination light L1 is approximately the same as the integration cycle of the TDI sensor, the spot of the illumination light L1 in the visual field region 511 may have an ellipse shape with a major axis extends in the β-axis direction. Thereby, it is possible to reduce the difference in intensity between the center and the end in the profile of the illumination light L1, and to improve the uniformity of the illumination light L1.

Second Embodiment

Next, an illumination apparatus according to a second embodiment will be described. The illumination apparatus of the present embodiment scans the mirror that reflects the illumination light L1 toward the sample 500 instead of scanning the optical member 610 that reflects the laser light L1 toward the target 112.

Figure 20:
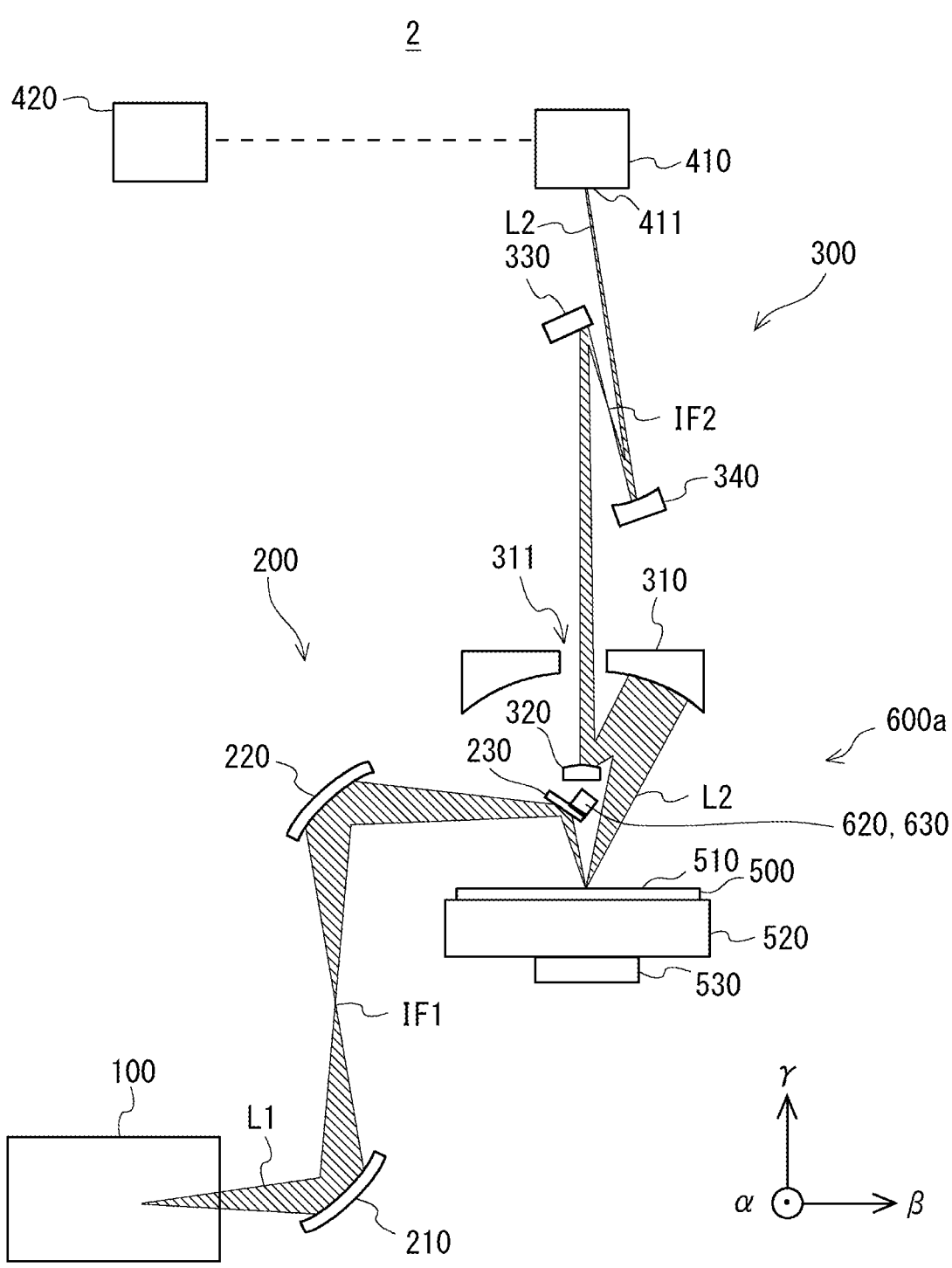
FIG. 20 is a configuration diagram illustrating an illumination apparatus according to a second embodiment.

FIG. 20 is a configuration diagram illustrating an illumination apparatus according to the second embodiment. In an illumination apparatus 600a of the present embodiment, a drive unit 620 drives a dropping mirror 230 of an inspection apparatus 2. In the illumination apparatus 600a, the dropping mirror 230 corresponds to the optical member 610 of the first embodiment. The dropping mirror 230 reflects illumination light L1 onto a sample 500. The drive unit 620 drives the dropping mirror 230 such that the illumination light L1 scans a visual field region 511 in a β-axis direction.

According to the present embodiment, the dropping mirror 230 is scanned, and thus the illumination light L1 scans the visual field region 511. Therefore, responsiveness of scanning of the illumination light L1 can be improved. Further, the scanned illumination light L1 does not pass through the illumination optics system 200. In other words, the illumination light L1 directly scans the visual field region 511. Therefore, the slope error in the illumination optics system 200 can be prevented. In the illumination apparatus 600a, the dropping mirror 230 is used as the optical member 610, but the present disclosure is not limited thereto. For example, the illumination light L1 scans using the collector mirror 120, the ellipsoid mirrors 210 and 220, or the like. Other configurations and effects are included in the description of the first embodiment.

Third Embodiment

Next, an illumination apparatus of a third embodiment will be described. In an illumination apparatus 600 of the present embodiment, a control unit 630 controls a drive unit 620 to cause the illumination light L1 to scan more than a predetermined plurality of times of scanning in one-time integration cycle of the TDI sensor. In this case, the laser light LR or the illumination light L1 may scan the optical member 610 without synchronizing with the integration cycle of the TDI sensor. When the scanning of the laser light LR or the illumination light L1 does not synchronize with the integration cycle, non-uniformity in brightness of the number of scans/(number of scans+1) will occur. Therefore, when the scanning of the laser light LR or the illumination light L1 can be performed at a sufficiently high speed, the non-uniformity in brightness can be relatively reduced. For example, when a polygon mirror is used for the optical member 610, the scanning of the laser light LR or the illumination light L1 can be performed at high speed.

As described above, according to the present embodiment, the control unit 630 causes the illumination light L1 to scan more than a predetermined plurality of times of scanning in one-time integration cycle of the TDI sensor that receives light from the visual field region 511 illuminated by the illumination light L1. The predetermined plurality of times may be determined by testing the number of times in advance that the non-uniformity in brightness becomes small enough to be ignored.

Fourth Embodiment

Next, an illumination apparatus of a fourth embodiment will be described. By modulating the intensity of the laser light LR so as to correct the intensity distribution of scan illumination in addition to optimizing the illumination shape by control of a drive waveform using the drive unit 620 such as an actuator, it is also possible to generate flat illumination. Further, it is also possible to generate flat illumination by combining drive waveform control and intensity control of the laser light.

Figure 21:
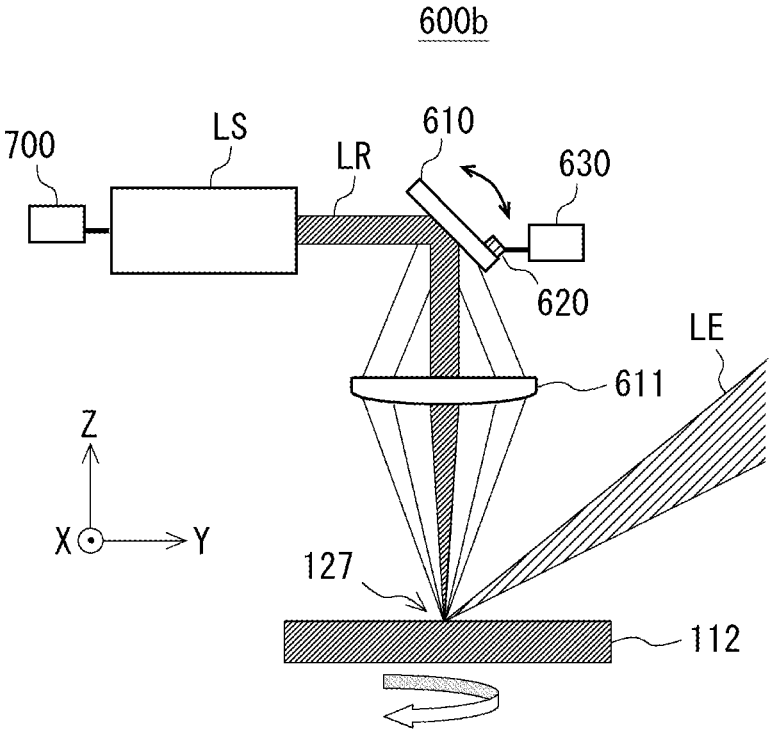
FIG. 21 is a diagram illustrating an illumination apparatus according to a fourth embodiment.

FIG. 21 is a diagram illustrating an illumination apparatus 600*b* according to the fourth embodiment. As illustrated in FIG. 21, the illumination apparatus 600*b* of the present embodiment further includes a light source control unit 700. The light source control unit 700 controls the intensity of the laser light LR. For example, the light source control unit 700 controls the intensity of the laser light LR so as to synchronize with the integration cycle of the TDI. Thereby, the light source control unit 700 can change the intensity of the illumination light L1 so as to synchronize with the integration cycle of the TDI. Moreover, the illumination method of the present embodiment further includes a step of changing the intensity of the illumination light L1 so as to synchronize with the integration cycle of the TDI. The present embodiment will be described below in comparison with a comparative example. First, a comparative example will be described.

Figure 22:
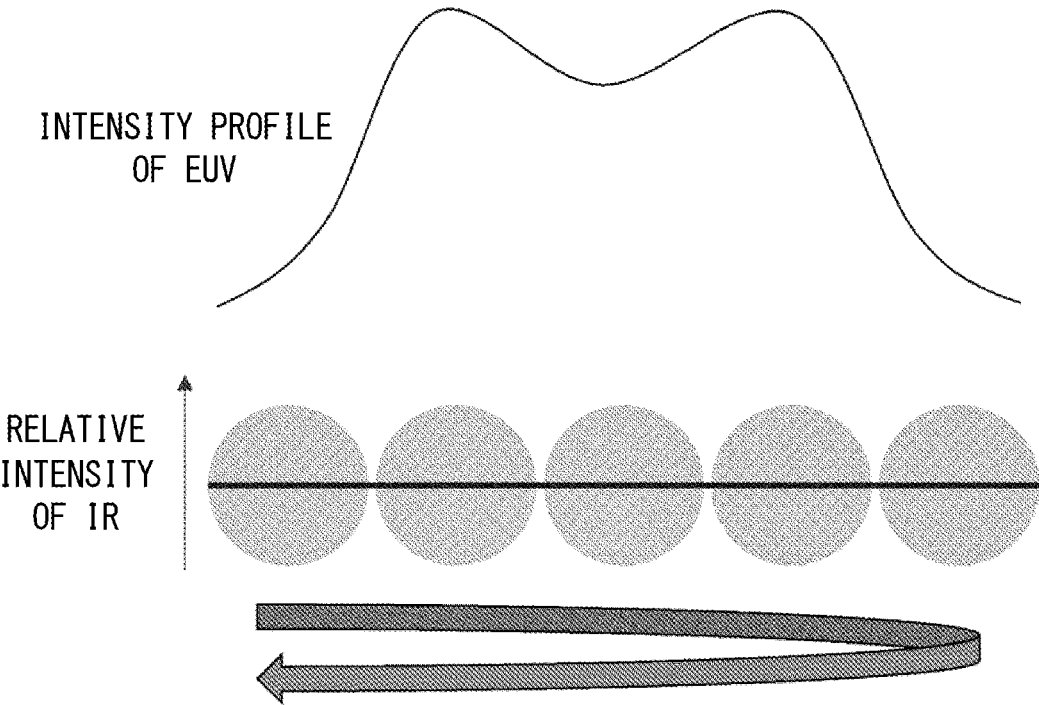
FIG. 22 is a diagram illustrating a corresponding relationship between a relative intensity of laser light and an intensity profile of illumination light when scanning of the laser light is performed in an illumination apparatus according to a comparative example.

FIG. 22 is a diagram illustrating a corresponding relationship between a relative intensity of the laser light LR and an intensity profile of the illumination light (EUV light) when scanning of the laser light LR (IR light) is performed in an illumination apparatus according to the comparative example. As illustrated in FIG. 22, according to the comparative example, the laser light LR performs beam scanning while keeping the relative intensity constant. In this case, the profile of the EUV light has a relatively low-intensity portion and a relatively high-intensity portion.

Figure 23:
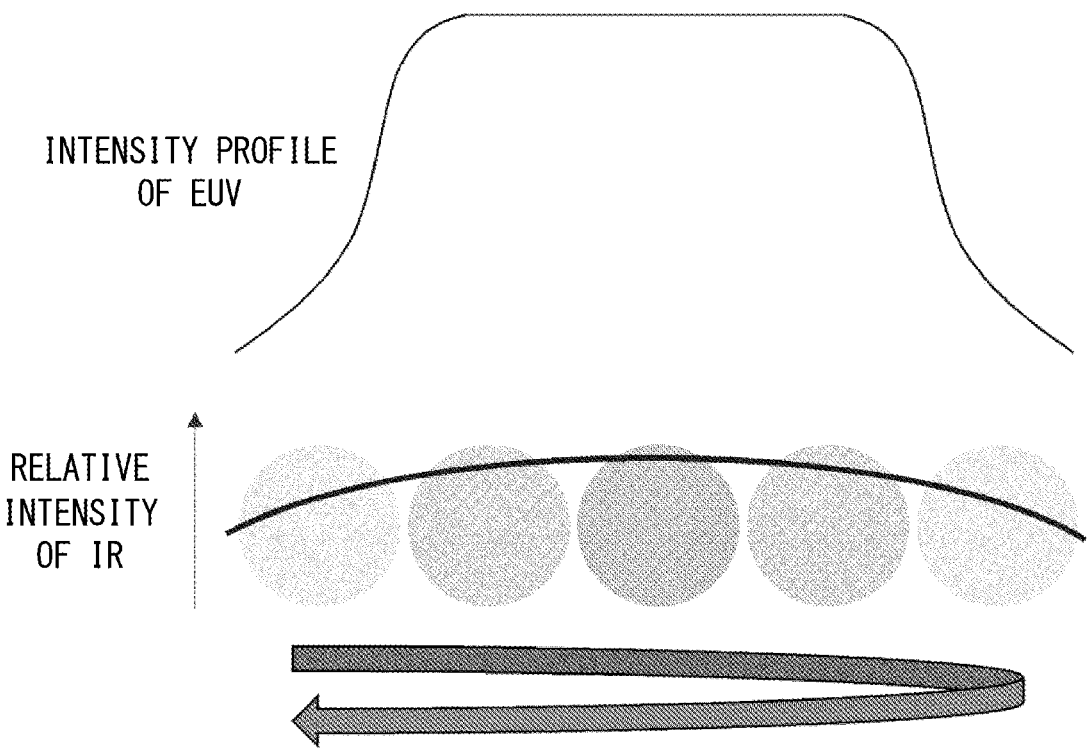
FIG. 23 is a diagram illustrating a corresponding relationship between a relative intensity of laser light and an intensity profile of illumination light when scanning of the laser light is performed in the illumination apparatus according to the fourth embodiment.

Next, the illumination apparatus 600*b* of the present embodiment will be described. FIG. 23 is a diagram illustrating a corresponding relationship between a relative intensity of the laser light LR and an intensity profile of the illumination light (EUV light) when scanning of the laser light LR (IR light) is performed in the illumination apparatus 600*b* according to the fourth embodiment. As illustrated in FIG. 23, according to the present embodiment, the illumination apparatus 600*b* includes the light source control unit 700 that controls the intensity of the laser light LR in the light source 100. For example, the light source control unit 700 controls the intensity of the laser light LR such that the central portion of scanning becomes a relatively high intensity, and controls the intensity of the laser light LR such that the turning portions of scanning becomes a relatively low intensity. In this case, the profile of the EUV light has a flat intensity portion.

In this way, the light source control unit 700 modulates the intensity of the laser light LR so as to correct the intensity distribution of scan illumination. Thereby, flat illumination can be generated. Specifically, the intensity of the laser light LR is made large in the portions where the relative intensity of the illumination light is low, and the intensity of the laser light LR is made small in the portion where the relative intensity of the illumination light is high. Thereby, flat illumination can be generated. It is also possible to generate flat illumination by combining the waveform control of the drive unit 620 described above and the intensity control of the laser light LR of the present embodiment. In particular, when the driving (scanning) of the drive unit 620 such as an actuator is performed at high speed, responsiveness may be impaired. For this reason, the intensity control of the laser light LR may be more advantageous in terms of followability. Naturally, it is necessary to perform intensity modulation of the laser light LR in synchronization with TDI.

The intensity control of the laser light LR in the light source control unit 700 is not limited to the control of that the central portion of scanning to be a high intensity and the control of the turning portions of scanning to be a low intensity. The light source control unit 700 may perform any modulation as long as it controls the intensity of the laser light LR to provide flat illumination.

Fifth Embodiment

Next, a fifth embodiment will be described. The present embodiment is an example in which a beam shifter and an acousto-optical element (AOM) are used instead of the mirror as the optical member 610 driven by the drive unit 620.

Figure 24:
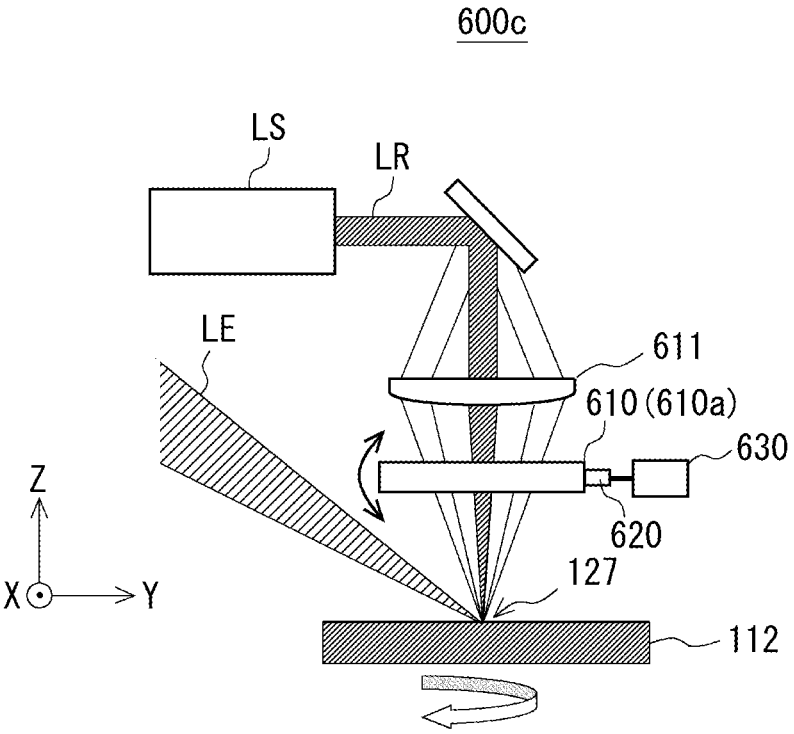
FIG. 24 is a diagram illustrating an optical member driven by a drive unit in an illumination apparatus according to a fifth embodiment.

FIGS. 24 and 25 are diagrams illustrating the optical member 610 driven by the drive unit 620 in an illumination apparatus 600*c* according to the fifth embodiment. As illustrated in FIG. 24, the optical member 610 may be a beam shifter 610*a* that shifts the irradiation position of the laser light LR. Thereby, the beam shifter 610*a* can cause the illumination light L1 to scan the illumination position. Therefore, the drive unit 620 drives the beam shifter 610*a* such that the illumination light L1 scans the visual field region.

Further, as illustrated in FIG. 25, the optical member 610 may be an AOM 610*b* that shifts the irradiation position of the laser light LR. Thereby, the AOM 610*b* can cause the illumination light L1 to scan the illumination position. Therefore, the drive unit 620 drives the AOM 610*b* such that the illumination light L1 scans the visual field region.

Sixth Embodiment

A sixth embodiment will be described below. In an illumination apparatus 600 of the present embodiment, the drive unit 620 drives the optical member 610 such that the illumination light L1 has a moving component that scans, in one direction, the visual field region 511 that is a region extending in the one direction on the sample 500. The control unit 630 controls the drive unit 620 to cause the illumination light L1 having the moving component in one direction to scan in synchronization with an integration cycle of the TDI sensor that receives light from the visual field region 511 illuminated by the illumination light L1. The illumination light L1 may illuminate the visual field region 511 in a plurality of spots at the same time, and the control unit 630 may control the drive unit 620 such that the moving component in one direction of each of the plurality of spots of the illumination light L1 (illumination light L11, illumination light L12, . . . , and illumination light LN in a case of an integer number of N spots) scans in synchronization with the integration cycle of the TDI sensor.

Further, the scanning of the illumination light L1 having the moving component in one direction (the β-direction in FIG. 6) may synchronize with the integration cycle of the TDI sensor that receives light from the visual field region 511 illuminated by the illumination light L1, and in the meantime, the scanning of the illumination light L1 may be accompanied by the moving component orthogonal to one direction (the α-direction in FIG. 6).

Further, one or more spots of the illumination light L1 in the visual field region 511 may be a rectangular shape, a linear shape, or other shapes in addition to the circular shape and the ellipse shape. The shapes of two or more spots may be substantially the same or different shapes, and two or more spots may be arranged vertically or horizontally.

In the present embodiment, the illumination light L1 may also contain the EUV light LE generated from the plasma 127 generated by irradiation of the target 112 with the laser light LR. In this case, the optical member 610 may define an irradiation position of the laser light LR onto the target 112. Specifically, the optical member 610 may an irradiation position at which the laser light LR emitted from the exciting laser LS irradiates the target 112 via the optical member 610. The illumination apparatus 600 may include not only a single optical member 610 but also a plurality of optical members 610. The plurality of optical members 610 may define the irradiation position of the laser light LR onto the target 112. The single or plurality of optical members 610 are not limited to the mirror such as the piezo steering mirror, the galvanometer mirror, the polygon mirror, and may include a member that transmits the laser light LR. The optical member 610 that transmits such laser light LR may define the irradiation position of the laser light LR onto the target 112. In addition, single or plurality of optical members 610 may include not only the above-described mirror that reflects the laser light LR and the member that transmits the laser light LR, but also at least one of a beam shifter that shifts the irradiation position of the laser light LR, an acousto-optical element that shifts the irradiation position of the laser light LR, and an electro-optical element that changes the irradiation position of the laser light LR. Here, the electro-optical element includes an element that controls a path of light using a change in refractive index due to voltage, and includes, for example, a KTN optical scanner using a KTN crystal, which is an oxide crystal containing potassium, tantalum, and niobium.

The single or plurality of optical members 610 may define a position, at which the EUV light LE is irradiated onto the sample 500, on an optical path from the generation position of the plasma 127 to the sample 500. In other words, as described above, the optical member 610 may define a position of the sample 500 to be irradiated with the illumination light L1 such as the EUV light LE, similar to the function of defining the irradiation position of the laser light LR onto the target 112. In this case, as in the case of the laser light LR described above, the single or plurality of optical members 610 may include at least one of a mirror that reflects the illumination light L1 toward the sample 500, a beam shifter that shifts the illumination position of the illumination light L1 with respect to the sample 500, an acousto-optical element that shifts the illumination position of the illumination light L1 with respect to the sample 500, and an electro-optical element that changes the illumination position of the illumination light L1 with respect to the sample 500.

The drive unit 620 drives the optical member 610 such that the laser light LR has a moving component that scans the target 112 in a predetermined direction, thereby causing the illumination light L1 to have a moving component that scans in one direction. As described above, when the illumination apparatus 600 includes a plurality of optical members 610, the drive unit 620 may cause the illumination light L1 to have a moving component that scans in one direction by driving the plurality of optical members 610. The moving component of the laser light LR that scans the target 112 in a predetermined direction may be referred to as a laser light moving component. Thus, the visual field region 511, which is a region extending in one direction on the sample 500, is distinguished from the moving component of the illumination light L1 that scans in one direction.

The TDI sensor may include a plurality of image sensor arrays having a plurality of image sensors. As described above, the TDI sensor may transfer information between the image sensors belonging to the same image sensor array. It is preferable that the above-described one direction (β-direction in FIG. 6) on the sample 500 in which the visual field region 511 extends is substantially the same as a direction in which the image sensor arrays are arranged (see FIGS. 15 and 17). In other words, it is preferable that the scanning direction (β-direction in FIG. 6) and the direction in which the image sensors transferring information are arranged are orthogonal to each other (see FIGS. 15 and 17). Thereby, the illumination light L1 having the moving component can scan in one direction in synchronization with the integration cycle of the TDI sensor.

The control unit 630 controls the drive unit 620 to set the number of times of execution of round-trip scanning, including a moving component on one side in one direction and a moving component on another side in one direction of the illumination light L1 in one cycle of the integration cycle of the TDI sensor, to an integer. Here, one-time integration cycle of the TDI sensor may be referred to as one-cycle integration cycle of the TDI sensor.

An illumination method of the present embodiment includes a step of driving the optical member 610 such that the illumination light L1 has a moving component that scans, in one direction, the visual field region 511 that is a region extending in the one direction on the sample 500, and a step of causing the illumination light L1 having the moving component in one direction to scan in synchronization with an integration cycle of the TDI sensor that receives light from the visual field region 511 illuminated by the illumination light L1.

The step of driving the optical member 610 may include causing the illumination light LR to have a moving component that scans in one direction by driving the optical member 610 such that the laser light LR has a laser light moving component that scans the target 112 in a predetermined direction. Further, the step of driving the optical member 610 may include setting the number of times of execution of round-trip scanning, including a moving component on one side in one direction and a moving component on another side in one direction of the illumination light L1 in one cycle of the integration cycle of the TDI sensor, to an integer. It is sufficient that the number of times of execution of round-trip scanning, including the moving component on one side (for example, +β-direction in FIG. 6) in one direction and the moving component on another side (for example, −β-direction in FIG. 6) in one direction of the illumination light L1 in one cycle of the integration cycle of the TDI sensor is an integer, and in the meantime, the scanning of the illumination light L1 may be accompanied by the moving component orthogonal to one direction (the α-direction in FIG. 6).

According to the present embodiment, the illumination light L1 having the moving component can scan in one direction in synchronization with the integration cycle of the TDI sensor, the visual field region 511 detected by the detector 410 can be uniformly illuminated. Other configurations and effects are included in the descriptions of the first to fifth embodiments.

Seventh Embodiment

The case has been described in the illumination apparatus 600 of the third embodiment described above in which the control unit 630 controls the drive unit 620 to scan more than a predetermined plurality of times of scanning in one-time integration cycle of the TDI sensor. In the present embodiment, the drive unit 620 drives the optical member 610 such that the illumination light L1 has a moving component that scans, in one direction, the visual field region 511 that is a region extending in the one direction on the sample 500. The control unit 630 controls the drive unit 620 to cause the illumination light L1 to scan more than a predetermined number of times in one-cycle integration cycle of the TDI sensor that receives light from the visual field region 511 illuminated by the illumination light L1. With such a configuration, as in the third embodiment, the non-uniformity in brightness can be relatively reduced. Even in the present embodiment, the illumination light L1 may illuminate the visual field region 511 in a plurality of spots at the same time, and the control unit 630 may control the drive unit 620 such that the number of times of scanning of the moving component in one direction for each of the plurality of spots of the illumination light L1 (illumination light L11, illumination light L12, . . . , and illumination light LN in a case of an integer number of N spots) is greater than a predetermined number of times in the integration cycle of the TDI sensor. Further, one or more spots of the illumination light L1 in the visual field region 511 may be a rectangular shape, a linear shape, or other shapes in addition to the circular shape and the ellipse shape. The shapes of two or more spots may be substantially the same or different shapes, and two or more spots may be arranged vertically or horizontally.

The illumination method of the present embodiment includes a step of driving the optical member 610 such that the illumination light L1 has a moving component that scans, in one direction, the visual field region 511 that is a region extending in the one direction on the sample 500, and a step of causing the illumination light L1 to scan in one direction more than a predetermined number of times in one-cycle integration cycle of the TDI sensor that receives light from the visual field region 511 illuminated by the illumination light L1. Configurations and effects of the present embodiment other than those described above are included in the descriptions of the first to sixth embodiments.

Although the embodiments of the present disclosure have been described above, the present disclosure includes appropriate modifications that do not impair the object and advantages thereof and is not limited to the above-described embodiments. Further, the configurations of the first to seventh embodiments may be combined appropriately. Further, the following configurations are also included in the scope of the technical ideas of the present disclosure.

Supplementary Note 1

An illumination apparatus includes:
a drive unit configured to drive an optical member such that illumination light scans, in one direction, a visual field region that is a region extending in the one direction on a sample; and
a control unit configured to control the drive unit to cause the illumination light to scan in synchronization with an integration cycle of a TDI sensor that receives light from the visual field region illuminated by the illumination light.

Supplementary Note 2

In the illumination apparatus according to Supplementary note 1, the illumination light contains EUV light generated from plasma generated by irradiation of a target with laser light,
the optical member includes a mirror that reflects the laser light onto the target, and
the drive unit causes the illumination light to scan the visual field region in the one direction by driving the optical member such that the laser light scans the target in a predetermined direction.

Supplementary Note 3

In the illumination apparatus according to Supplementary note 2, the drive unit drives the optical member such that a relationship between a position of the laser light on the target and time involves a triangular wave.

Supplementary Note 4

In the illumination apparatus according to Supplementary note 2, the drive unit drives the optical member such that a relationship between a position of the laser light on the target and time involves at least one of the three waveforms: triangular wave, sine wave, rectangular wave, or a combined and overlapped waveform of any of those three waveforms.

Supplementary Note 5

In the illumination apparatus according to Supplementary note 1, a spot of the illumination light in the visual field region has a circular shape.

Supplementary Note 6

In the illumination apparatus according to Supplementary note 1, a spot of the illumination light in the visual field region has an ellipse shape with a major axis extending in another direction orthogonal to the one direction.

Supplementary Note 7

In the illumination apparatus according to Supplementary note 1, the optical member includes at least one of a mirror that reflects the illumination light onto the sample, a beam shifter that shifts an illumination position of the illumination light, and an acousto-optical element that shifts an illumination position of the illumination light, and
the drive unit drives the optical member such that the illumination light scans the visual field region in the one direction.

Supplementary Note 8

An illumination apparatus includes:
a drive unit configured to drive an optical member such that illumination light scans, in one direction, a visual field region that is a region extending in the one direction on a sample; and
a control unit configured to control the drive unit to cause the illumination light to scan more than a predetermined plurality of times of scanning in one-time integration cycle of a TDI sensor that receives light from the visual field region illuminated by the illumination light.

Supplementary Note 9

An illumination method includes steps of:
driving an optical member such that illumination light scans, in one direction, a visual field region that is a region extending in the one direction on a sample; and
causing the illumination light to scan in synchronization with an integration cycle of a TDI sensor that receives light from the visual field region illuminated by the illumination light.

Supplementary Note 10

In the illumination method according to Supplementary note 9, the illumination light contains EUV light generated from plasma generated by irradiation of a target with laser light,
the optical member includes a mirror that reflects the laser light onto the target, and
the step of driving the optical member includes causing the illumination light to scan the visual field region in the one direction by driving the optical member such that the laser light scans the target in a predetermined direction.

Supplementary Note 11

In the illumination method according to Supplementary note 10, the step of driving the optical member includes driving the optical member such that a relationship between a position of the laser light on the target and time involves a triangular wave.

Supplementary Note 12

In the illumination method according to Supplementary note 10, the step of driving the optical member includes driving the optical member such that a relationship between a position of the laser light on the target and time involves at least one of the three waveforms: triangular wave, sine wave, rectangular wave, or a combined and overlapped waveform of any of those three waveforms.

Supplementary Note 13

In the illumination method according to Supplementary note 9, a spot of the illumination light in the visual field region has a circular shape.

Supplementary Note 14

In the illumination method according to Supplementary note 9, a spot of the illumination light in the visual field region has an ellipse shape with a major axis extending in another direction orthogonal to the one direction.

Supplementary Note 15

In the illumination method according to Supplementary note 9, the optical member includes at least one of a mirror that reflects the illumination light onto the sample, a beam shifter that shifts an illumination position of the illumination light, and an acousto-optical element that shifts an illumination position of the illumination light, and
the step of driving the optical member includes driving the optical member such that the illumination light scans the visual field region in the one direction.

Supplementary Note 16

An illumination method includes steps of:
driving an optical member such that illumination light scans, in one direction, a visual field region that is a region extending in the one direction on a sample; and
causing the illumination light to scan more than a predetermined plurality of times of scanning in one-time integration cycle of a TDI sensor that receives light from the visual field region illuminated by the illumination light.

Supplementary Note 17

In the illumination apparatus according to any one of Supplementary notes 1 to 8, the illumination apparatus further includes a light source control unit configured to change an intensity of the illumination light in synchronization with the integration cycle of the TDI sensor.

Supplementary Note 18

In the illumination method according to any one of Supplementary notes 9 to 16, the illumination method further includes a step of changing an intensity of the illumination light in synchronization with the integration cycle of the TDI sensor.

Additionally, the following points may be considered. In other words, for example, in a case of using an IR laser light that emits pulsed light, it is necessary to optimize the relationship between the repetition frequency of the laser light and the scan frequency. When the number of scans is small, such as several times (for example, corresponding to the first embodiment), the repetition frequency of the laser light needs to be sufficiently higher than the scan frequency. This is because the laser light does not emit continuously light, so when the repetition frequency is low, the discrete light emission of the laser light will cause non-uniformity in the intensity profile. For example, as a worst case, when only one pulse is emitted under conditions where only one scan is performed during integration, the profile will be the same as when no scan is performed.

On the other hand, when the number of scans exceeds several dozen times (for example, corresponding to the third embodiment), the repetition frequency of the laser light and the scan frequency can be made to be approximately the same by performing the following synchronous operation. By synchronizing both and slightly shifting the repetition frequency of the laser light from the scan frequency, uniform illumination within the plane can be achieved. Further, when the repetition frequency of the laser light is sufficiently higher than the scan frequency, the frequencies of the laser light do not need to synchronize with each other.

Furthermore, part or all of the processing of the control unit 630 of the illumination apparatus 600 described above may be executed by a computer program. The above-described program includes a set of instructions (or software codes) that, when read into a computer, causes the computer to perform one or more of the functions described in the embodiments. The program may be stored in a non-transitory computer-readable medium or in a physical storage medium. By way of example rather than limitation, a computer-readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer-readable medium or a communication medium. By way of example rather than limitation, the transitory computer-readable medium or the communication medium may include electrical, optical, acoustic, or other forms of propagating signals.

The technical scope of the embodiments also includes the following illumination program that causes a computer to execute the illumination method of the present embodiments.

A non-transitory computer-readable medium causing a computer to: drive an optical member such that illumination light scans, in one direction, a visual field region that is a region extending in the one direction on a sample; and cause the illumination light to scan in synchronization with an integration cycle of a TDI sensor that receives light from the visual field region illuminated by the illumination light.

A non-transitory computer-readable medium causing a computer to: drive an optical member such that illumination light scans, in one direction, a visual field region that is a region extending in the one direction on a sample; and cause the illumination light to scan more than a predetermined plurality of times of scanning in one-time integration cycle of a TDI sensor that receives light from the visual field region illuminated by the illumination light.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first to the fifth embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An illumination apparatus comprising:

a drive unit configured to drive an optical member such that illumination light has a moving component that scans, in one direction, a visual field region that is a region extending in the one direction on a sample; and a control unit configured to control the drive unit to cause the illumination light having the moving component in one direction to scan in synchronization with an integration cycle of a TDI sensor that receives light from the visual field region illuminated by the illumination light, wherein the sample is an object for which images are acquired by the TDI sensor.

2. The illumination apparatus according to claim 1, wherein the illumination light contains EUV light generated from plasma generated by irradiation of a target with laser light, the optical member defines an irradiation position of the laser light onto the target, and the drive unit causes the illumination light to have the moving component that scans in the one direction by driving the optical member such that the laser light has a laser light moving component that scans the target in a predetermined direction.

3. The illumination apparatus according to claim 2, wherein the drive unit drives the optical member such that a relationship between a position of the laser light on the target and time involves a triangular wave.

4. The illumination apparatus according to claim 2, wherein the drive unit drives the optical member such that a relationship between a position of the laser light on the target and time involves at least one of the three waveforms: triangular wave, sine wave, rectangular wave, or a combined and overlapped waveform of any of those three waveforms.

5. The illumination apparatus according to claim 1, wherein the illumination light contains EUV light generated from plasma, and the optical member defines a position, at which the EUV light is irradiated onto the sample, on an optical path from a generation position of the plasma to the sample.

6. The illumination apparatus according to claim 1, wherein a spot of the illumination light in the visual field region has a circular shape.

7. The illumination apparatus according to claim 1, wherein a spot of the illumination light in the visual field region has an ellipse shape with a major axis extending in another direction orthogonal to the one direction.

8. The illumination apparatus according to claim 1, wherein the optical member includes at least one of a mirror that reflects the illumination light onto the sample, a beam shifter that shifts an illumination position of the illumination light, an acousto-optical element that shifts an illumination position of the illumination light, and an electro-optical element, and the drive unit drives the optical member such that the illumination light scans the visual field region in the one direction.

9. The illumination apparatus according to claim 1, wherein the TDI sensor includes a plurality of image sensor arrays having a plurality of image sensors, and transfers information between the image sensors belonging to the same image sensor array, and the one direction is substantially equal to a direction in which the image sensor arrays are arranged.

10. The illumination apparatus according to claim 1, wherein the control unit controls the drive unit to set the number of times of execution of round-trip scanning including the moving component on one side in the one direction and the moving component on another side in the one direction of the illumination light in one cycle of the integration cycle of the TDI sensor, to an integer.

11. The illumination apparatus according to claim 1, further comprising a light source control unit configured to change an intensity of the illumination light in synchronization with the integration cycle of the TDI sensor.

12. An illumination apparatus comprising:

a drive unit configured to drive an optical member such that illumination light has a moving component that scans, in one direction, a visual field region that is a region extending in the one direction on a sample; and a control unit configured to control the drive unit to cause the illumination light to scan in the one direction more than a predetermined number of times in one cycle of an integration cycle of the TDI sensor that receives light from the visual field region illuminated by the illumination light, wherein the sample is an object for which images are acquired by the TDI sensor.

13. An illumination method comprising steps of:

driving an optical member such that illumination light has a moving component that scans, in one direction, a visual field region that is a region extending in the one direction on a sample; and causing the illumination light having the moving component in the one direction to scan in synchronization with an integration cycle of a TDI sensor that receives light from the visual field region illuminated by the illumination light, wherein the sample is an object for which images are acquired by the TDI sensor.

14. The illumination method according to claim 13, wherein the illumination light contains EUV light generated from plasma generated by irradiation of a target with laser light, the optical member defines an irradiation position of the laser light onto the target, and the step of driving the optical member includes causing the illumination light to have the moving component that scans in the one direction by driving the optical member such that the laser light has a laser light moving component that scans the target in a predetermined direction.

15. The illumination method according to claim 14, wherein the step of driving the optical member includes driving the optical member such that a relationship between a position of the laser light on the target and time involves a triangular wave.

16. The illumination method according to claim 14, wherein the step of driving the optical member includes driving the optical member such that a relationship between a position of the laser light on the target and time involves at least one of the three waveforms: triangular wave, sine wave, rectangular wave, or a combined and overlapped waveform of any of those three waveforms.

17. The illumination method according to claim 13, wherein the illumination light contains EUV light generated from plasma, and the optical member defines a position, at which the EUV light is irradiated onto the sample, on an optical path from a generation position of the plasma to the sample.

18. The illumination method according to claim 13, wherein a spot of the illumination light in the visual field region has a circular shape.

19. The illumination method according to claim 13, wherein a spot of the illumination light in the visual field region has an ellipse shape with a major axis extending in another direction orthogonal to the one direction.

20. The illumination method according to claim 13, wherein the optical member includes at least one of a mirror that reflects the illumination light onto the sample, a beam shifter that shifts an illumination position of the illumination light, an acousto-optical element that shifts an illumination position of the illumination light, and an electro-optical element, and the step of driving the optical member includes driving the optical member such that the illumination light scans the visual field region in the one direction.

21. The illumination method according to claim 13, wherein the TDI sensor includes a plurality of image sensor arrays having a plurality of image sensors, and transfers information between the image sensors belonging to the same image sensor array, and the one direction is substantially equal to a direction in which the image sensor arrays are arranged.

22. The illumination method according to claim 13, wherein the step of driving the optical member includes setting the number of times of execution of round-trip scanning including the moving component on one side in the one direction and the moving component on another side in the one direction of the illumination light in one cycle of the integration cycle of the TDI sensor, to an integer.

23. The illumination method according to claim 13, further comprising a step of changing an intensity of the illumination light in synchronization with the integration cycle of the TDI sensor.

24. An illumination method comprising steps of:

driving an optical member such that illumination light has a moving component that scans, in one direction, a visual field region that is a region extending in the one direction on a sample; and causing the illumination light to scan more than a predetermined number of times in the one direction in one cycle of an integration cycle of the TDI sensor that receives light from the visual field region illuminated by the illumination light, wherein the sample is an object for which images are acquired by the TDI sensor.

* * * * *